United States Patent
Stonecipher

(10) Patent No.: US 7,711,716 B2
(45) Date of Patent: May 4, 2010

(54) OPTIMIZATIONS FOR A BACKGROUND DATABASE CONSISTENCY CHECK

(75) Inventor: Ryan Lindsey Stonecipher, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 227 days.

(21) Appl. No.: 11/682,535

(22) Filed: Mar. 6, 2007

(65) Prior Publication Data

US 2008/0222150 A1   Sep. 11, 2008

(51) Int. Cl.
*G06F 7/00* (2006.01)

(52) U.S. Cl. .................. 707/691; 707/692; 707/693

(58) Field of Classification Search .............. 707/690, 707/687, 691, 692, 693
See application file for complete search history.

(56) References Cited

U.S. PATENT DOCUMENTS

| | | |
|---|---|---|
| 4,672,632 A | 6/1987 | Andersen |
| 4,791,561 A | 12/1988 | Huber |
| 5,493,692 A | 2/1996 | Theimer et al. |
| 5,513,126 A | 4/1996 | Harkins et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,615,342 A | 3/1997 | Johnson |
| 5,623,422 A | 4/1997 | Williams |
| 5,675,779 A | 10/1997 | Doktor |
| 5,689,642 A | 11/1997 | Harkins et al. |
| 5,790,801 A | 8/1998 | Funato |
| 5,794,210 A | 8/1998 | Goldhaber et al. |
| 5,809,251 A | 9/1998 | May et al. |
| 5,812,865 A | 9/1998 | Theimer et al. |
| 5,841,854 A | 11/1998 | Schumacher et al. |
| 5,859,979 A | 1/1999 | Tung et al. |
| 5,893,075 A | 4/1999 | Plainfield et al. |
| 5,931,913 A | 8/1999 | Meriwether et al. |
| 5,960,423 A | 9/1999 | Chaudhuri et al. |
| 5,963,910 A | 10/1999 | Ulwick |
| 6,012,152 A * | 1/2000 | Douik et al. .................. 714/26 |
| 6,014,135 A | 1/2000 | Fernandes |

(Continued)

FOREIGN PATENT DOCUMENTS

EP   1594070 A2   9/2005

(Continued)

OTHER PUBLICATIONS

Hewlett-Packard Development Company, LP., Sybase Database Migration, 2004, 19 pages.

(Continued)

*Primary Examiner*—James Trujillo
*Assistant Examiner*—Fatima P Mina
(74) *Attorney, Agent, or Firm*—Workman Nydegger

(57) ABSTRACT

Two features allow for increased performance in running database consistency checks. First, a database consistency check runs directly on a database, as opposed to running on a saved database snapshot. This saves memory since there is no need to save a database snapshot. To handle any pages modified since a start of the database consistency check, a supplemental check runs on modified pages. Any facts generated by either check run through an early aggregation that attempts to aggregate facts during the database consistency check.

16 Claims, 21 Drawing Sheets

U.S. PATENT DOCUMENTS

| | | | |
|---|---|---|---|
| 6,014,669 A * | 1/2000 | Slaughter et al. | 707/10 |
| 6,029,195 A | 2/2000 | Herz | |
| 6,032,189 A | 2/2000 | Jinzenji et al. | |
| 6,035,306 A * | 3/2000 | Lowenthal et al. | 707/200 |
| 6,044,486 A | 3/2000 | Underseth et al. | |
| 6,073,142 A | 6/2000 | Geiger et al. | |
| 6,112,098 A | 8/2000 | Flint et al. | |
| 6,119,101 A | 9/2000 | Peckover | |
| 6,127,946 A | 10/2000 | Tzidon et al. | |
| 6,157,955 A | 12/2000 | Narad et al. | |
| 6,163,683 A | 12/2000 | Dunn et al. | |
| 6,167,253 A | 12/2000 | Farris et al. | |
| 6,167,445 A | 12/2000 | Gai et al. | |
| 6,167,450 A | 12/2000 | Angwin et al. | |
| 6,181,684 B1 | 1/2001 | Turcotte et al. | |
| 6,188,905 B1 | 2/2001 | Rudrapatna et al. | |
| 6,212,550 B1 | 4/2001 | Segur | |
| 6,243,398 B1 | 6/2001 | Kahane et al. | |
| 6,272,146 B1 | 8/2001 | Bowater et al. | |
| 6,279,112 B1 | 8/2001 | O'Toole et al. | |
| 6,285,987 B1 | 9/2001 | Roth et al. | |
| 6,292,480 B1 | 9/2001 | May | |
| 6,332,126 B1 | 12/2001 | Peirce et al. | |
| 6,336,194 B1 | 1/2002 | Dahman et al. | |
| 6,385,454 B1 | 5/2002 | Bahl et al. | |
| 6,421,655 B1 | 7/2002 | Horvitz et al. | |
| 6,421,730 B1 | 7/2002 | Narad et al. | |
| 6,438,217 B1 | 8/2002 | Huna | |
| 6,438,603 B1 | 8/2002 | Ogus | |
| 6,463,265 B1 | 10/2002 | Cohen et al. | |
| 6,466,232 B1 | 10/2002 | Newell et al. | |
| 6,493,685 B1 | 12/2002 | Ensel et al. | |
| 6,513,046 B1 | 1/2003 | Abbott, III et al. | |
| 6,549,915 B2 | 4/2003 | Abbott, III et al. | |
| 6,571,216 B1 | 5/2003 | Garg et al. | |
| 6,578,076 B1 | 6/2003 | Putzolu | |
| 6,587,876 B1 | 7/2003 | Mahon et al. | |
| 6,654,734 B1 | 11/2003 | Mani et al. | |
| 6,658,095 B1 | 12/2003 | Yoakum et al. | |
| 6,671,695 B2 | 12/2003 | McFadden | |
| 6,697,840 B1 | 2/2004 | Godefroid et al. | |
| 6,738,931 B1 | 5/2004 | Osborn et al. | |
| 6,747,675 B1 | 6/2004 | Abbott et al. | |
| 6,751,636 B1 | 6/2004 | Mende, Jr. et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,826,540 B1 | 11/2004 | Plantec et al. | |
| 6,839,554 B2 | 1/2005 | McDowell et al. | |
| 6,842,877 B2 | 1/2005 | Robarts et al. | |
| 6,957,248 B2 | 10/2005 | Quine et al. | |
| 6,968,179 B1 | 11/2005 | De Vries | |
| 6,988,132 B2 | 1/2006 | Horvitz | |
| 7,010,600 B1 | 3/2006 | Prasad et al. | |
| 7,035,923 B1 | 4/2006 | Yoakum et al. | |
| 7,046,680 B1 | 5/2006 | McDysan et al. | |
| 7,085,786 B2 * | 8/2006 | Carlson et al. | 707/204 |
| 7,103,806 B1 | 9/2006 | Horvitz | |
| 7,149,795 B2 | 12/2006 | Sridhar et al. | |
| 7,185,073 B1 | 2/2007 | Gai et al. | |
| 7,277,905 B2 * | 10/2007 | Randal et al. | 707/204 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0112056 A1 | 8/2002 | Baldwin et al. | |
| 2002/0118772 A1 | 8/2002 | Lin | |
| 2002/0138572 A1 | 9/2002 | Delany et al. | |
| 2002/0156879 A1 | 10/2002 | Delany et al. | |
| 2002/0161862 A1 | 10/2002 | Horvitz | |
| 2002/0174199 A1 | 11/2002 | Horvitz | |
| 2003/0004679 A1 | 1/2003 | Tryon et al. | |
| 2003/0023711 A1 | 1/2003 | Parmar et al. | |
| 2003/0033421 A1 | 2/2003 | Haeri et al. | |
| 2003/0046401 A1 | 3/2003 | Abbott et al. | |
| 2003/0097485 A1 | 5/2003 | Horvitz et al. | |
| 2003/0139970 A1 | 7/2003 | Badura et al. | |
| 2003/0154476 A1 | 8/2003 | Abbott, III et al. | |
| 2003/0191676 A1 | 10/2003 | Templeton | |
| 2004/0143636 A1 | 7/2004 | Horvitz et al. | |
| 2005/0034078 A1 | 2/2005 | Abbott et al. | |
| 2005/0165860 A1 | 7/2005 | Cabrera et al. | |
| 2005/0223043 A1 * | 10/2005 | Randal et al. | 707/200 |
| 2006/0036574 A1 * | 2/2006 | Schweigkoffer et al. | 707/2 |
| 2008/0019281 A1 * | 1/2008 | Liger et al. | 370/252 |

FOREIGN PATENT DOCUMENTS

| | | |
|---|---|---|
| WO | WO 9800787 | 1/1998 |

OTHER PUBLICATIONS

Bhattacharya, et al., Coordinating Backup/Recovery and Data Consistency between Database and File Systems, Jun. 4-6, 2002, 12 pages, ACM SIGMOD, Madison Wisconsin, USA.

Microsoft Corporation, Planning Protection Schedules, http://www.microsoft.com/technet/prodtechnol/dpm/proddocs/7f70f48c-6661-4573-ac17-47, Published Apr. 8, 2005, Updated Aug. 17, 2005, 5 pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Silver, et al. "Unified Network Presence Management." Nortel Networks Wireless Solutions. Last accessed Dec. 30, 2006, 6 pages.

Carlson J., et al., "Channel Expansion Theory and the Experiential Nature of Media Richness Perceptions", Academy of Management vol. 42, No. 2, Apr. 1, 1999, p. 153-170.

Horvitz, et al. "Attention-Sensitive Alerting", In Proceedings of UAI '99, Conference on Uncertainty and Artificial Intelligence, Stockholm, Sweden, Jul. 1999, 10 pages.

Eric J. Horvitz and Adrian C. Klein, "Utility-Based Abstraction and Categorization", Palo Alto Laboratory, Rockwell International Research, 1993, 8 pages.

Horvitz, et al. "Decision Theory in Expert Systems and Artificial Intelligence", Jul. 1988, 38 pages.

European Search Report dated Aug. 28, 2003, for International Application Serial No. 02000906.4.-1244-.

Kurapati, et al. "A Multi-Agent TV Recorder, Adaptive Systems Department", Philips Research Briarcliff, 2001, 8 pages.

International Search Report dated Sep. 7, 2002 for PCT Application Serial No. PCT02/07894, filed Mar. 15, 2002.

Webster's II New Riverside University Dictionary, Houghton Mifflin Company, 1994, pp. 496. In OA Dated Aug. 11, 2008 for U.S. Appl. No. 11/250,848, 40 pages.

OA Dated Oct. 16, 2008 for U.S. Appl. No. 10/036,566, 24 pages.

\* cited by examiner

OPTIMIZATIONS FOR A BACKGROUND DATABASE CONSISTENCY CHECK

TECHNICAL FIELD

The subject specification relates generally to databases and in particular to a database consistency check.

BACKGROUND

In the computer industry, a database typically refers to a collection of information stored in a specific structure. Furthermore, the specific structure normally arranges data as a plurality of objects commonly consisting of queries and tables. A database management system (DBMS) functions as a control system for the database. Different types of DBMSs exist for different types of data models; moreover, data models are both a way of structuring data and a way of defining operation performable on data.

One common DBMS is a relational database management system (RDBMS) which is so named because it uses a relational data model, generally formed from theory and predicate logic. A RDBMS has numerous tables where the system maintains data collection in rows and columns. A common RDBMS used in conjunction with databases is a sever using Transact-Structured Query Language. Structured Query Language (SQL) is a programming language commonly used in databases with several variations available, typically in proprietary form.

In a typical database network, a relational database management system (RDBMS) operates with database consistency checks (DBCCs) during off-peak hours. In most databases, there exists a source and a snapshot database when a DBCC takes place. The source database contains the database as a whole, whereas the database snapshot contains a sparse copy of the database. Before a user performs a database transaction, a system makes copies of each page the user is changing in the source database. This allows the DBCC to function in regards to a consistent point of time. A reason for creating snapshots is to allow for corrections of bad transactions.

The DBCC reads the pages from the database snapshot if the snapshot is present. If the page being read by the DBCC has been changed since the snapshot was created, then the version of the page in the DB snapshot is used; if not, then the source database page is used. In this operation, the DBCC does not utilize pages changed by an ongoing operation, and typically performs a fact-matching algorithm. The system reads an internal data structure in disk-allocation-order. As the system performs the reads, it generates and stores pieces of information called facts in an internal storage structure. After completion of reads, the system matches and aggregates the stored facts to determine if any incorrect facts are present. Consequently, a large number of checks are performed for just a single pass over the database structure. The snapshot database and the fact-matching algorithm consume a large amount of disk space, which is proportional to a rate of change in a source database since pages are copied when they are modified by a user transaction.

SUMMARY

The following discloses a simplified summary of the specification in order to provide a basic understanding of some aspects of the specification. This summary is not an extensive overview of the subject specification. It is intended to neither identify key or critical elements of the subject specification nor delineate the scope of the subject specification. Its sole purpose is to disclose some concepts of the specification in a simplified form as a prelude to the more detailed description that is disclosed later.

Two disclosed principles allow for improved checking of consistency in a database. The first principle relates to running a database consistency check (DBCC). The DBCC runs on a database without creating a database snapshot. This allows the DBCC to run directly on pages of a database without creating a snapshot (that consumes valuable system resources). When pages are changed in a database during running of the DBCC, a supplemental check can take place that generates facts for the changed page—this does not create an un-necessary copy of a changed page.

A second principle is early fact aggregation. This principle allows for aggregation of facts while consistency checks are taking place. Facts that cannot be cancelled are stored in a sorted arrangement so relevant facts can be quickly found. Each time a fact is generated, it is compared with already existing facts to determine if any facts can be cancelled. This lowers amount of memory used during aggregation since facts can be cancelled without waiting for a generation of all facts. Accordingly, consistency checking is improved over conventional schemes, and utilization of valuable system resources is mitigated.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
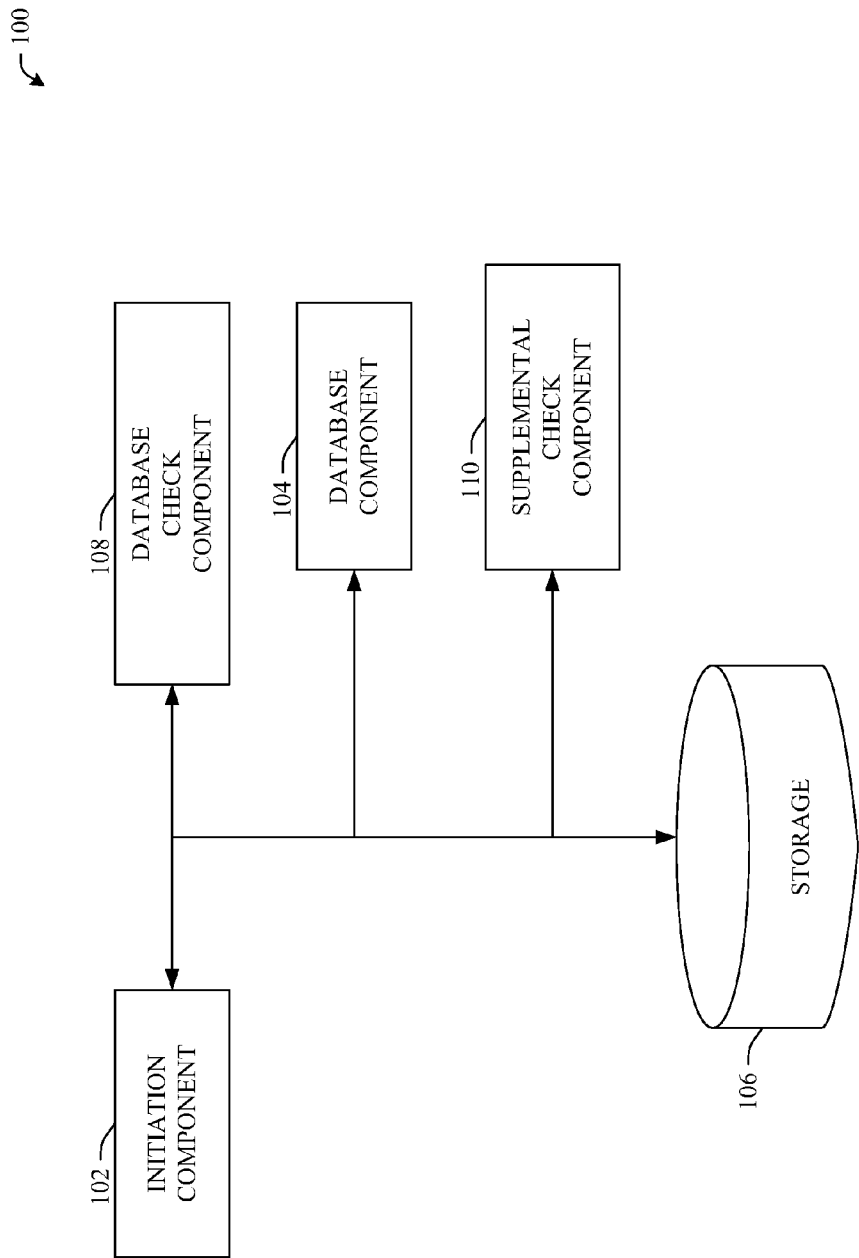
FIG. 1 illustrates a representative database server with a database check component in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 is an example database server 100 with several consistency check components. A database server 100 has an initiation component 102 that starts consistency checks to be executed on database component 104. This initiation takes place for example based on a received command, which can originate from several different locations. In one embodiment, the command originates from a host device. An instance of this initiation is a network administrator sending the command from a computer to run consistency checks. In another embodiment, the command originates from within the database server. There can be a timing circuit in the initiation component, and after a specific duration of time (e.g., one week since the previous check), the initiation component initiates a new series of checks. Each time the command runs, the initiation component can send a signal to a storage component 106 to log that an initiation has taken place.

There are two main kinds of consistency checks that run on database component 104: a database consistency check (DBCC) and a supplemental consistency check (SCC). Database check component 108 runs the DBCC on pages of information stored in the database component 104. The DBCC scans pages directly from the database component 104, without use of a database snapshot. Since no database snapshot is employed, a supplemental check component 110 runs a SCC on pages that have changed since start of the DBCC. A consistency check only needs to read a page once, so if one check scans a page (e.g., SCC), then other checks (e.g., DBCC) do not need to scan the same page again.

When checking respective pages of the database component 104, the DBCC generates facts relating to the page. A generated fact is a packet of information about a page in a database component 104. An example of a generated fact is information that a first page points to a second page (e.g., a pointer). These pointers should point to one another; such that, if page 'X' points to page 'Y' then page 'Y' should point to page 'X'. However, if pointers do not point to one another at the completion of consistency checks, that is indicative of an error in database consistency. Generated facts are stored in a storage component 106. These facts can be stored in any suitable configuration, including in a sorted arrangement. The storage component 106 can have an aggregation component that cancels facts against one another. After aggregation, any facts left over represent consistency errors.

There are several important cases where there should be synchronization with copy-on-write processes (e.g., processes present in the functioning of the supplemental check component 110) and the database check component 108. In a first case, the DBCC asks for a page that has changed since commencement of the DBCC. Since the page has changed, the page has been read by the SCC. In this case, the DBCC synchronizes correctly with copy-on-write threads to ensure the DBCC does not generate facts for pages twice (e.g. once from the SCC and once from the DBCC). In typical operation, the database check component 104 consults with an in-memory bitmap in a storage location 108 to determine if the copy-on-write already generated facts for a page. If the copy-on-write generated no facts, then database check component 104 generates these facts.

In a second case, the DBCC requests a page that already exists in a database. A DBCC scanner, which is commonly part of the database check component 104, reads the page as is typical, and generates facts based on that page. For a DBCC scanner to read a page, it should not have changed since the command began. In a third scenario, a user transaction modifies the page and performs the fact generation. The supplemental check component 110 checks this page automatically and generates appropriate facts.

The subject specification describes a number of benefits over running a database snapshot. The only save made by the DBCC is saving facts about a page, which requires a smaller amount of disk space then a full copy of a page. In addition, it is faster to run a single check on a database component 104 then to save a copy, and then run a check. The checking process takes less time, and as a result, there is a smaller window to change pages, which means faster consistency checks are performed.

In an example of the system shown in FIG. 1, a credit card billing operation can employ a database sever, which uses the disclosed features. A credit card company can have a central database 104 that handles its financial matters. At 3 a.m. (local time) of each Saturday, for example, the system can run the consistency checks. While the attempt of running at "off-peak" hours can limit page changes, in a global economy, there are likely a number of page changes that take place at this time. These checks determine if there are any errors in the system, specifically relating to physical and logical consistency of the system. A common example of a page change is if a subscriber makes a credit card purchase, then a subscriber's financial debit changes due to this purchase, which modifies a page on the network that holds this information.

If the page change took place during running a DBCC, then the supplemental check component 110 would check the changed page and no copy of the page would need to be made for checking purposes. If there are no errors with the modified page, then the page transfers directly into the database with the only storage of the page being necessary facts. If there is an error (e.g., an inconsistency), then the supplemental check component 110 can operate accordingly.

Figure 2:
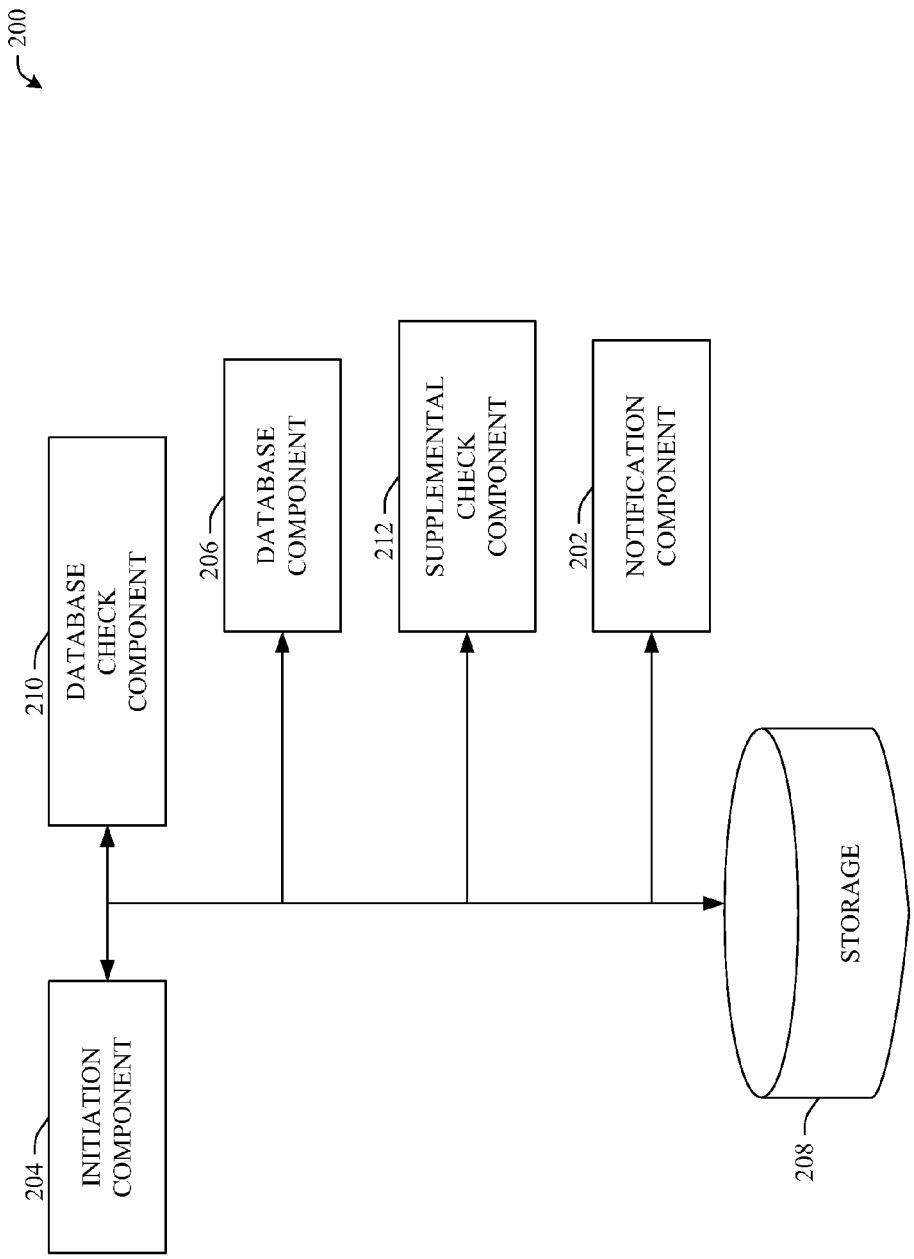
FIG. 2 illustrates a representative database server with a notification component in accordance with an aspect of the subject specification.

FIG. 2 is an example database server 200 with a notification component 202. An initiation component 204 begins a running of a series of checks on a database component 206, storing any necessary information in a storage component 208. A notification component 202 can send a notice that the initiation took place. For example, a message can travel from the notification component to an administrator that an initiation was successful. During any consistency check, there is typically a greater consumption of server resources then when there is no check taking place. Therefore, it can be beneficial that a subscriber (e.g., a customer attempting to modify information) be aware that a consistency check is taking place or about to take place. The notification component 202 can send a notice to a subscriber that an initiation has taken place and their experience can be affected if the consistency checks begin during a transaction. In another embodiment, the notification component 202 can send a notice to the database check component 210 and/or the supplemental check component 212 to pause a DBCC and/or SCC while the subscriber performs a transaction.

The server runs two different consistency checks. A first check, run by a database check component 210, verifies data in the database component 206, commonly in the form of pages. A second check, a SCC, run by a supplemental check component 212 checks any pages that have changed since a DBCC commenced, but before it completes. Any necessary facts about the pages are stored in the storage component 208. A subscriber that attempts a transaction while these checks are taking place can be provided a notice from the notification component 202 of the event. The notification component 202 can also implement a feature that notifies the subscriber of an expected time the check will complete or a guaranteed time when the check will complete. This allows the subscriber to select another time if he/she so chooses. This typically is merely a notification, so the subscriber can make an informed decision, though the notification component 202 can be configured to allow only limited access or no access. However, the notification component 202 can also send to the user the facts that the SCC generated from a scan of their changed page.

Figure 3:
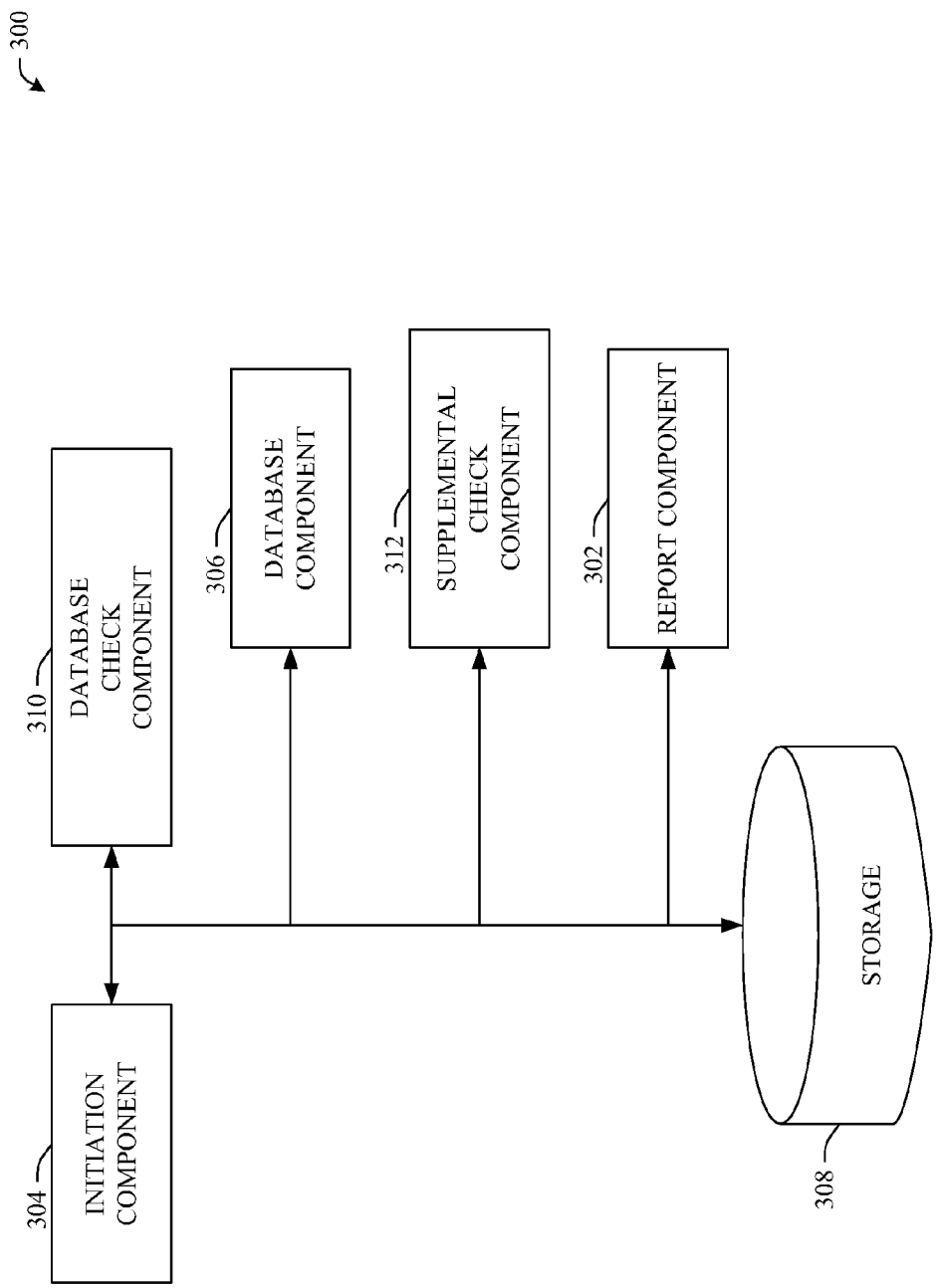
FIG. 3 illustrates a representative database server with a report component in accordance with an aspect of the subject specification.

FIG. 3 is an example database server 300 with a report component 302. An initiation component 304 initiates a command for running checks on a database component 306. A log of the initiation can be stored in a storage component 308. A report component 302 can access information stored in the storage component 308 and create a report based on that information. For example, the report component 302 could extract a log of the initiation from the storage component 308, and place the log information into a report. The report can then be sent out to a variety of destinations including a management component and another storage component. In addition, the report component 302 can communicate information relating to a failure. For example, if the initiation component 304 did not send out an initiation when it was supposed to, the report component 302 can send information about the failure to a diagnostic component.

The initiation component's 304 command instructs a database check component 310 and a supplemental check component 312 to run consistency checks on a database component 306. Any suitable information generated through the consistency checks can be used by the report component 302. The report component 302 can keep track of facts generated and send this information to a management system. This information can travel as an actual report (e.g., an organized format) or the information can travel as raw data. In addition, the report component 302 can send information to just one location or to a plurality of locations. The reported information that travels to different locations can be the same, some different and some the same, or different information. Once all checks complete, the report component 302 can send out raw data that the check has been completed. The report component 302 can transmit virtually every piece of information about the database server 300, and the consistency checks.

Figure 4:
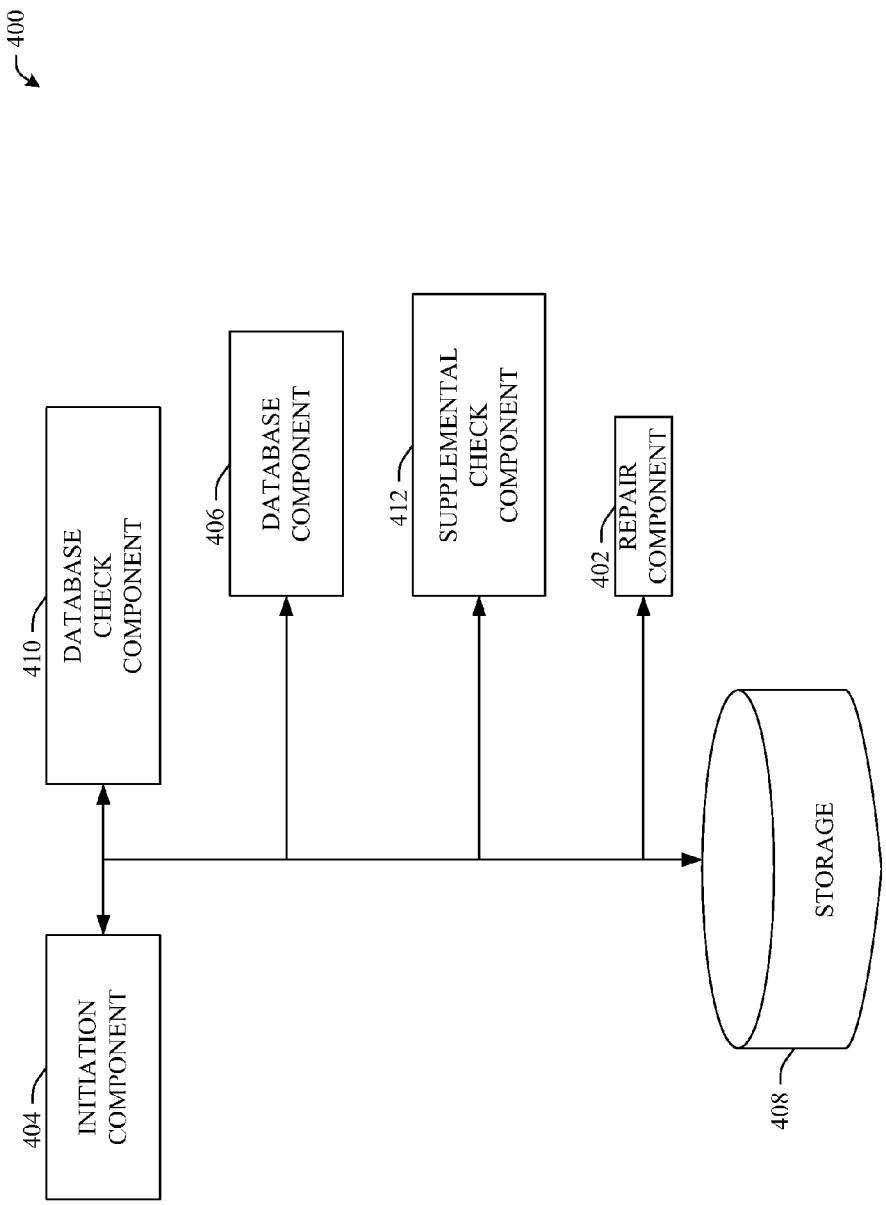
FIG. 4 illustrates a representative database server with a repairing component in accordance with an aspect of the subject specification.

FIG. 4 is an example database server 400 with a repair component 402. In normal operation, an initiation component 404 receives a command to initiate consistency checks on a database component 406. Based on the command appropriate checks are initiated. However, there are times in which the initiation component fails to initiate appropriate checks. A repair component 402 can attempt to repair the initiation component 404 so the appropriate checks can be run. This can be accomplished through a troubleshooting algorithm where the repair component 402 attempts several actions with the goal of one of the actions repairing the failure. Logs can be made about repair attempts, or the results of the attempts; and these logs can be stored in a storage component 408.

Other errors can occur in a database server 400. There can be errors with consistency checks, stemming from a database check component 410 and a supplemental check component 412. For example, either of these components could fail to operate properly (e.g., they do not produce any facts for any page when facts should be produced). The repair component 402 can attempt to repair each of these components 410, 412. A common way for the repair component 402 to perform repairs is having diagnostic capabilities to determine where the error is located. Once errors are determined, the repair component 402 can pinpoint a procedure to fix a discovered failure.

In normal operation, the database check component 410 and supplemental check component 412 generate facts based on performed scans of pages in the database component 406. At completion of scans, facts should be able to cancel out one another. However, any facts not cancelled signify a consistency error in the database component 406. A repair component 402 can attempt to correct any errors determined by the two different consistency checks. For example, if there are six facts that could not cancel, then the repair component 402 can attempt to isolate the problem. This can take place through a number of different means. Two of the six facts can be deleted by the repair component 402, while the new pointers can be created for three of the facts. The remaining sixth fact remains unchanged and continues in error. The repair component 402 can also be equipped with a transmission component that transmits error messages when the repair component 402 encounters a problem that it cannot repair.

In another embodiment, the repair component 402 integrates with repairing features not associated with consistency checks. For example, the repair component 402 can have both repairing capabilities for the displayed components as well as capabilities for correcting subscriber problems. A subscriber can attempt to log into their account. However, an error can occur that does not allow the subscriber to successfully log into their account. The repair component 402 can attempt to rectify this error. This demonstrates that the repair component 402 can integrate with repair features independent of constancy checks.

Figure 5:
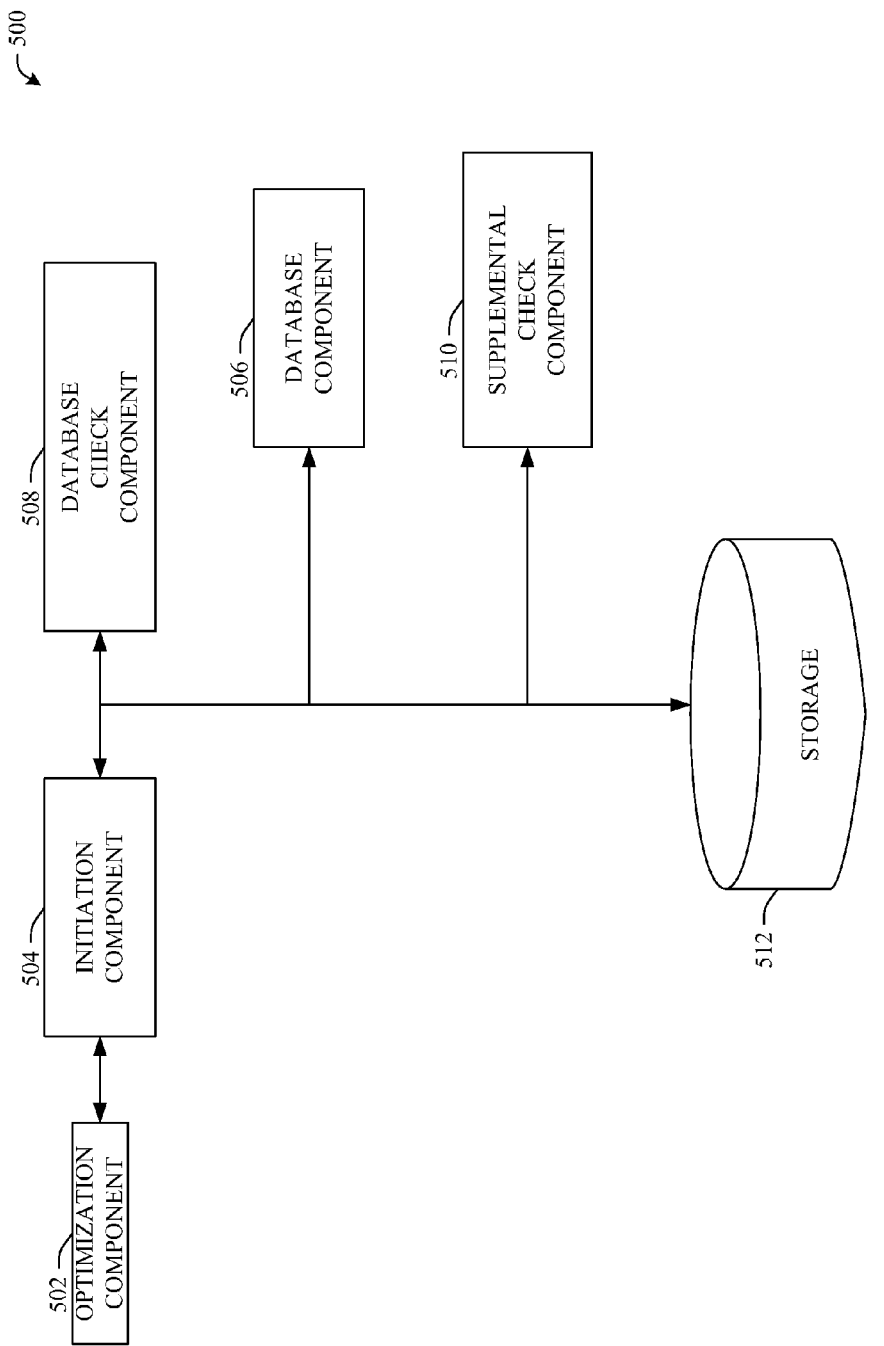
FIG. 5 illustrates a representative database server with an optimization component in accordance with an aspect of the subject specification.

FIG. 5 is an example database server 500 with an optimization component 502. There are certain times when it is best to run consistency checks. An optimization component 502 can function to have consistency checks run at an optimal time. For example, the optimization component 502 can send a command to an initiation component 504 that it is time to run necessary consistency checks.

There are several possible embodiments for the optimization component 502. A first embodiment is having a given set of parameters for running a consistency check. For example, the optimization component 502 can have a set parameter that if the number subscribers modifying pages of a database component 506 are less then a set number (e.g. fifty subscribers), then the optimization component 502 signals the initiation component 504 to initiate the checks. A database check component 508 and a supplemental check component 510 run a DBCC and SCC respectively on pages in a database component 506. Facts are generated during these checks and the facts are stored in a storage component 512. This embodiment can be further configured that checks take place no more often then in a period (e.g., once a week). This means that even if there are less then fifty subscribers, the checks will not run if the checks took place within a week.

A second embodiment is having a time window in which to run the checks and the optimization component 502 allows the checks based on stored history. For example, many billing databases have off-peak hours. An operation at 10:00 p.m. GMT can have most of the evening hours (e.g., 5 p.m.-9 p.m.) over the Atlantic Ocean. This could be an optimal time to conduct a check since a great deal of use can take place between the evening hours. The optimization component 502 can select a time in a window between 9 p.m. GMT and 11 p.m. GMT to run the check. A review can take place of a previous history of the time in the window. Base on the previous history, the optimization component 502 can instruct the initiation component 504 when to run the checks. The optimization component 502 can store its selection in memory and use information stored in memory the next time it selects to send a command.

A third embodiment of the optimization component 502 is notifying a server administrator that the checks should take place. For example, the optimization component 502 can keep track of how many pages have been modified. If there have been a specific number of page modifications (e.g. ten thousand modifications), then the optimization component 502 can send a message to an administrator that it so many modifications have taken place and the checks should be run. The server administrator can select the best time to run the checks. If the system administrator has not selected to run the checks in a given amount of time (e.g. within three days of receiving the message), then the optimization component 502 can send a reminder message.

In a further embodiment, the subject specification can be configured with the ability to run both a supplemental check as well as run a classical database snapshot operation. The optimization component 502 can select which operation would be best at the given time. For example, if on a certain database server 500 there have been a number of system crashes running one type, then the optimization component 502 can select to run the other type. Another example is if a database server 500 already has database snapshot capabilities, then the system can be re-configured with the capability of running a supplemental check; however, it may be wasteful to eliminate the database snapshot capability. Therefore, if there is an error in the running of the supplemental check component 510, the optimization component 502 can return the database server 500 to running a database snapshot. The optimization component 502 makes the appropriate selection and sends a command to the initiation component 504.

Figure 6:
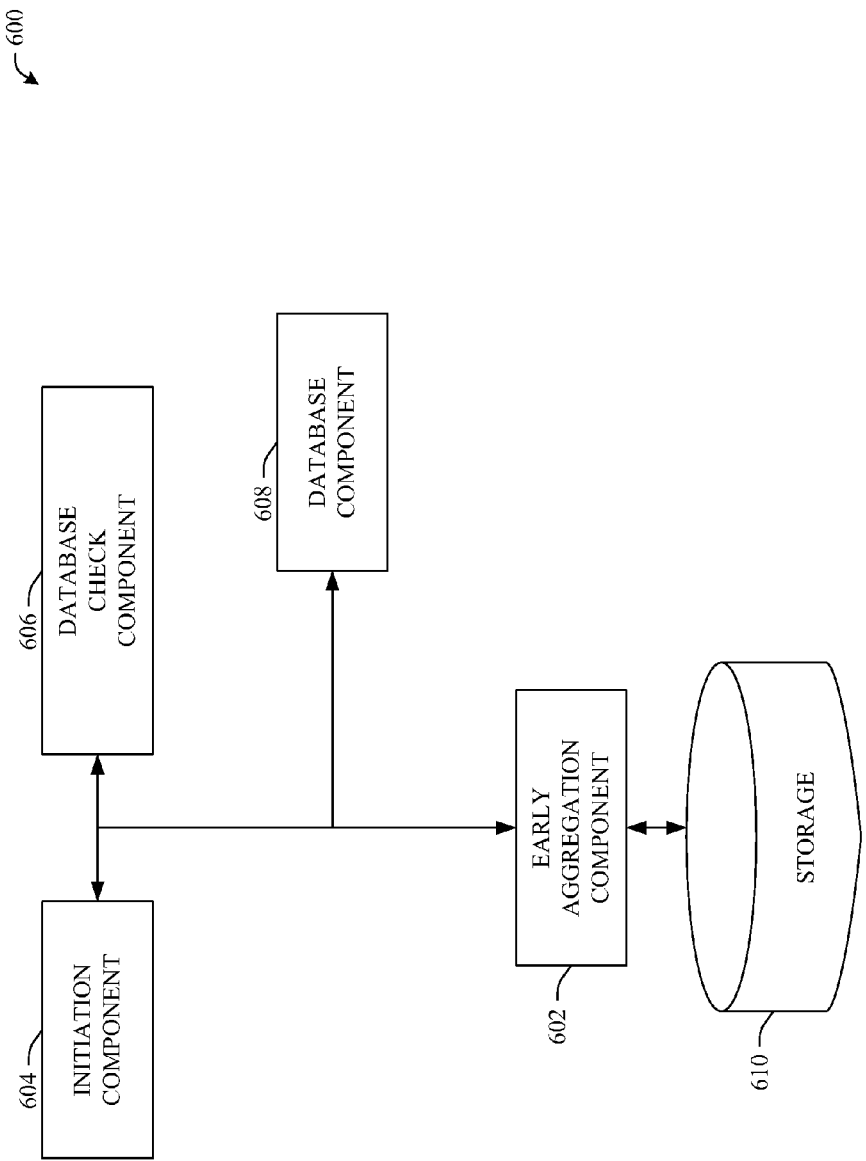
FIG. 6 illustrates a representative database server with an early aggregation component in accordance with an aspect of the subject specification.

FIG. 6 is an example database server 600 with an early aggregation component 602. An initiation component 604 signals to a database check component 606 to run a DBCC upon a database component 608. This initiation commonly takes place after a specific increment of time (e.g., once a month), though there can be other implementations, such as an initiation from a network administrator. The DBCC generates facts about each page it scans from the database component 608. Each fact passes through an early aggregation component 602 prior to entering a storage component 610. The early aggregation component 602 can operate in any configuration, including a configuration with a classic database snapshot.

The early aggregation component 602 compares each held fact (e.g. a fact that is currently in the early aggregation component 602) with the facts stored in the storage component 610. The comparison can be performed in a number of different manners, including comparing each stored fact with the held fact or only comparing the held fact with stored facts in certain classes. If the early aggregation component 602 can cancel a held fact with a stored fact, then it will perform a cancellation. If the held fact cannot be cancelled with a stored fact, then the held fact travels to the storage component 610 where it is stored. To keep an organization of the facts, the storage component 610 can store the facts in a sorted arrangement. Any fact not ultimately cancelled is considered an indication of a consistency error.

Figure 7:
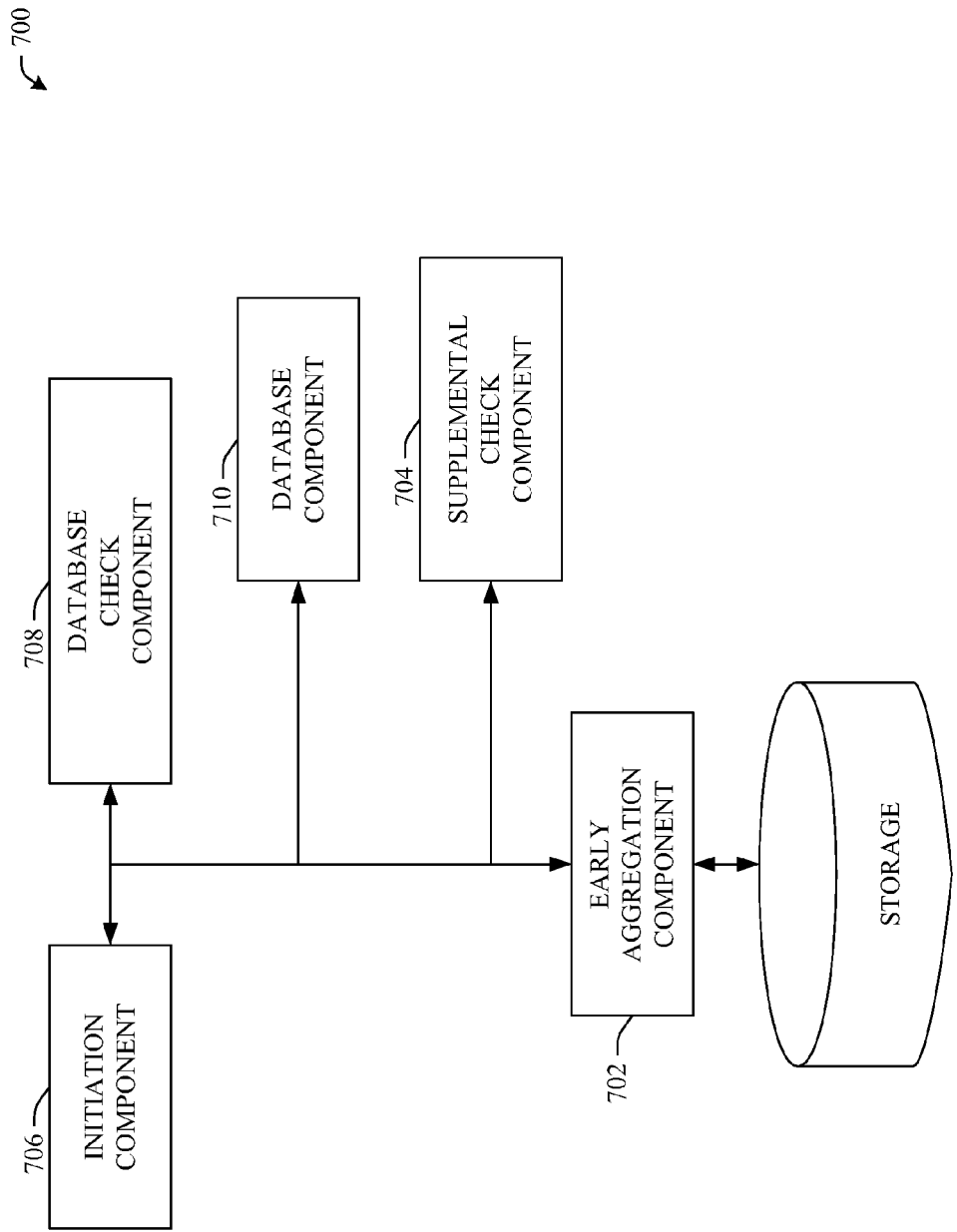
FIG. 7 illustrates a representative database server with a supplemental check component and an early aggregation component in accordance with an aspect of the subject specification.

FIG. 7 is an example of a database server 700 with both an early aggregation component 702 as well as a supplemental check component 704. An initiation component 706 signals to both a database check component 708 and a supplemental check component 704 to perform consistency checks on the contents of a database component 710. These checks are commonly a DBCC and a SCC respectively. Each fact passes through an early aggregation component 702 that attempts to eliminate a held fact with a stored fact. This drawing integrates the features of the supplemental check component 704 disclosed in other parts of the subject specification with the early aggregation component 702. While the components disclosed in the subject specification can add together in various configurations, this combination merits particular attention. This combination allows the principles of both the supplemental check component 704 and the early aggregation component 702 to be used together to create an efficient database consistency checking system.

Figure 8:
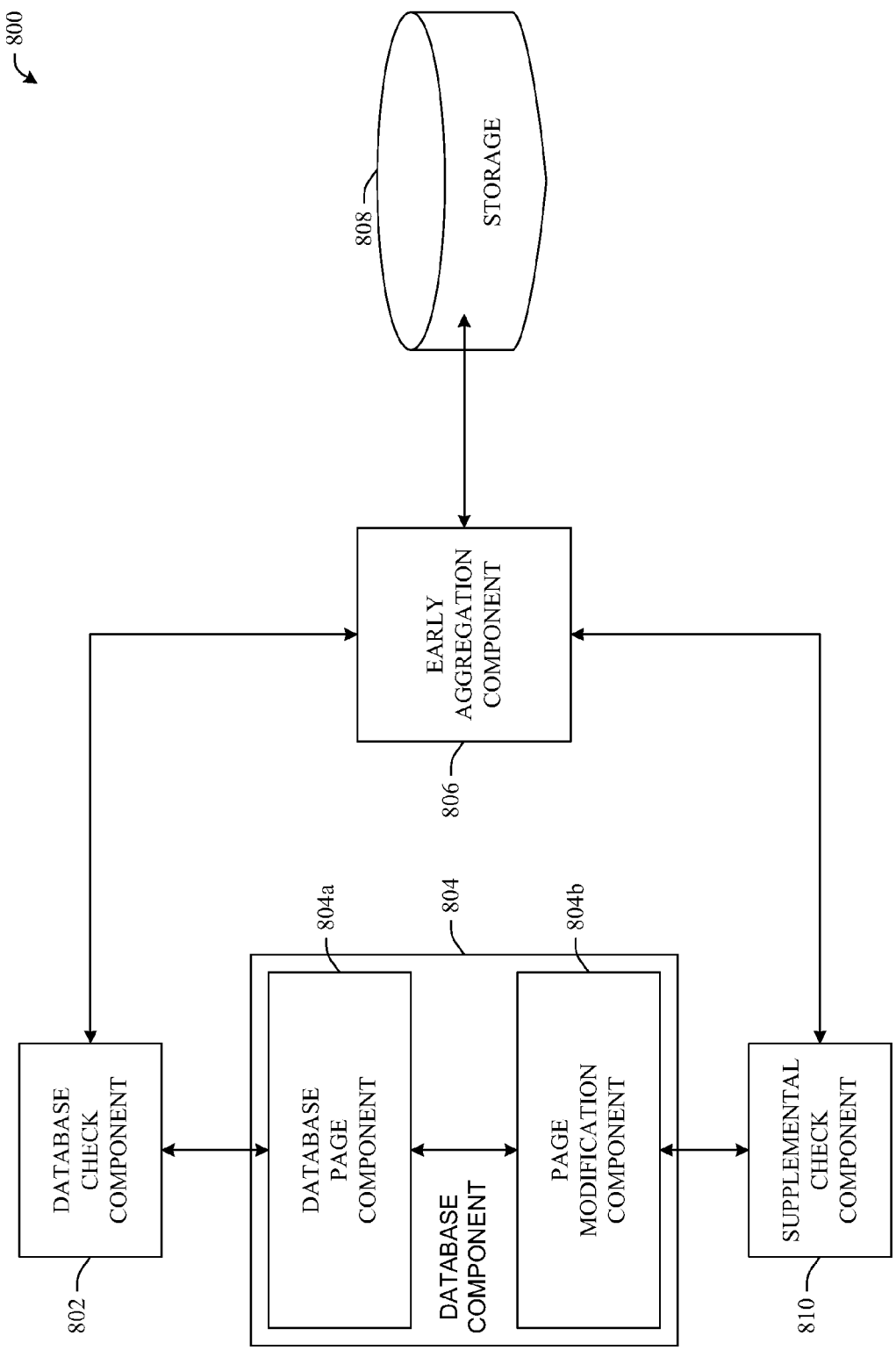
FIG. 8 illustrates a representative database server with a database page component and a subscriber modification component in accordance with an aspect of the subject specification.

FIG. 8 is an example of the operation of the functionality within database server 700 disclosed in FIG. 7 according to one embodiment 800 of the subject specification. When a DBCC begins, a database check component 802 reads pages located in the database component 804. Specifically, these pages are read from a database page component 804a. Each time a page is read, the database check component 802 generates facts for the page. These facts pass to an early aggregation component 806. The early aggregation component 806 compares a held fact with facts stored in a storage component 808

Facts that cannot be cancelled pass to the storage component 808. These facts are stored in a sorted arrangement (e.g., in a B-tree index). When facts can be cancelled, the early aggregation component 806 deletes both the held fact as well as the stored fact. Facts are commonly cancelled when the facts are a pointer (e.g., page "A" points to page "B") and a counterpoint (e.g., page "B" points to page "A").

There are instances when a page becomes modified during the running of the DBCC. A supplemental check component 810 runs a SCC, which checks any pages that are modified during the DBCC. The supplemental check component 810 reads these pages from a page modification component 804b, which is commonly located within the database component 804. Facts are also generated for the pages located in the page modification component 804b by the supplemental check component 810. These facts travel to the early aggregation component 806 where the same comparisons are made as the comparisons made for facts generated by the DBCC. A fact generated by the DBCC and stored in the storage component 808 can cancel with a fact generated by the SCC and visa versa.

Figure 9:
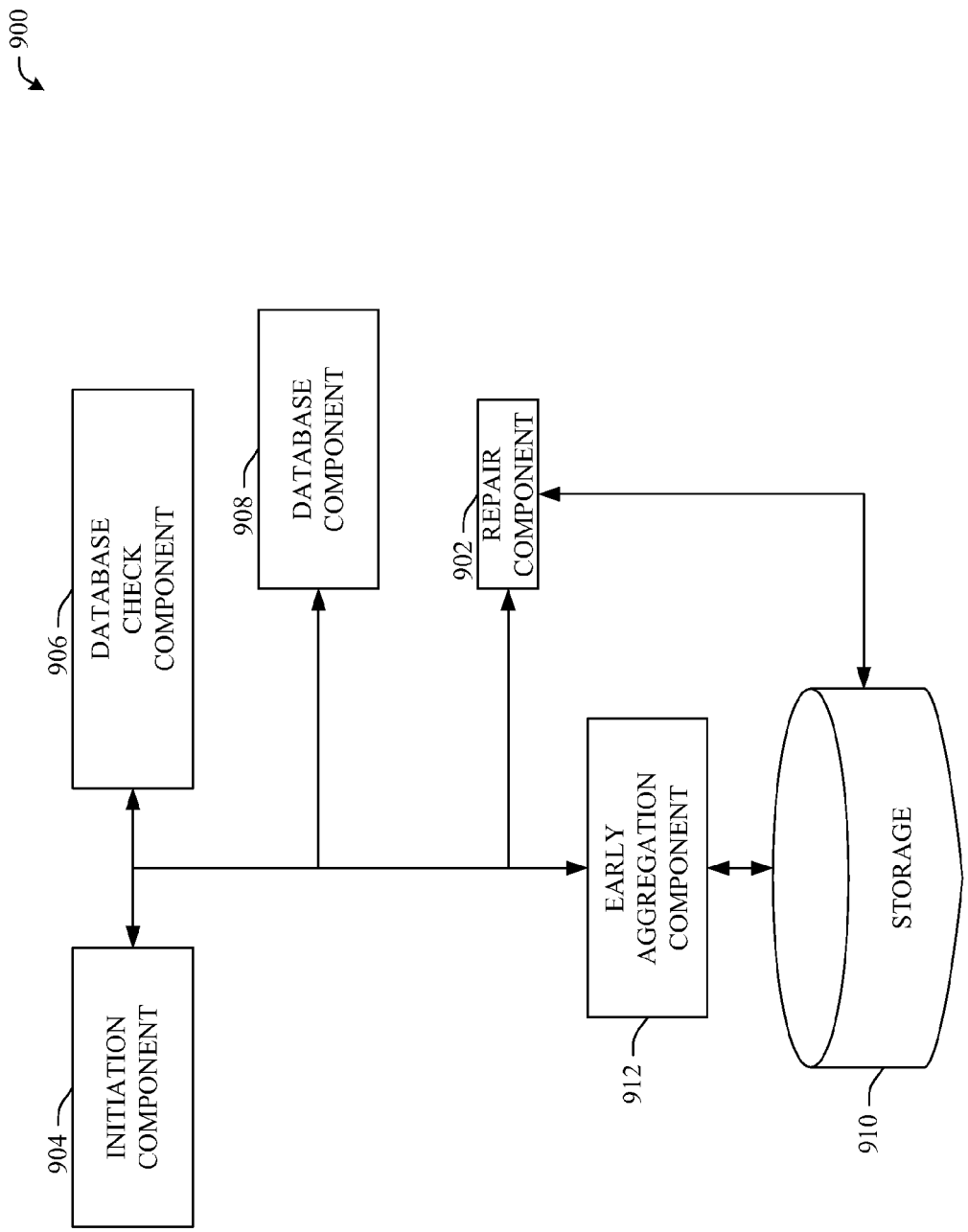
FIG. 9 illustrates a representative database server with a repair component in accordance with an aspect of the subject specification.

FIG. 9 is an example database server 900 with a repair component 902. An initiation component 904 can send an instruction to a database check component 906 to run a DBCC on a database component 908. However, there can be occasions when the initiation component 904 fails to send out the instruction at the appropriate time. A repair component 902 can attempt to fix any problems within a database server 900, including a failure of an initiation component 904. Once there is a successfully repair, the repaired component can resume functioning or it can wait until an appropriate time (e.g., when it receives a new command to initiate consistency checks). Any successful repair or repair attempts can be logged in the storage component 910 or memory within the repair component 902.

When an instruction arrives at the database check component 906, the database check component 906 should run a DBCC. However, it is possible that there is a failure to run the DBCC or the DBCC runs incorrectly. The repair component 902 can attempt to correct the error to allow for the running of a successful DBCC. When a successful DBCC takes place, facts are generated by the database check component 906 and these facts travel to an early aggregation component 912 that compares a held fact with facts stored in a storage component 910. The early aggregation component 912 can fail to make any comparison or make an incorrect comparison. The repair component 902 can attempt to repair any failures in the early aggregation component 912.

At completion of a DBCC and any fact aggregation, there should be no facts remaining in the storage component 910. All facts should have been cancelled by an aggregation process and any non-cancelled facts are considered indicators of system errors. The repair component 902 can attempt to rectify these errors. This rectification can take place through a number of different methods, including creating new return-points or by deleting already existent pointers.

In one embodiment of the subject specification, the repair component 902 attempts to repair errors prior to the completion of aggregation. This can take place when a finite number of pointers exist in a system. At minimum, the typical storage consumption would be 50% for an error-free system. This is because the early aggregation component 912 would store half of the facts. Any fact beyond half should be able to cancel with an already existing fact. Therefore, if there is ever more then 50% of the facts stored in a storage component 910, then it is known there is an error since there cannot be enough generated facts to cancel out all existing stored facts. If the total amount of facts generated is known prior to completion and the repair component 902 determines an error exists (e.g., the repair component 902 determines more then 50% of the facts have been generated), then the repair component can operate prior to completion of a DBCC to correct errors the facts represent.

There can be times the repair component 902 is unable to rectify an encountered problem. The repair component 902 can have a transmission component that transmits to an auxiliary component that it was unable to complete a successful repair. The auxiliary component (e.g., a maintenance system or an out of server repair component) can take appropriate steps relating to the unsuccessful repair. In one embodiment, the auxiliary component can be a more robust repair component with greater capabilities then the repair component. The auxiliary component can attempt to repair a cause of any failure. In another embodiment, the auxiliary component can merely log the fact a repair was unsuccessfully attempted.

The repair component 902 can also use the transmission component to document when a successful repair was made.

While this repair component 902 is similar to the repair component 402 in FIG. 4, this component has specific characteristics concerning the early aggregation component 912. It is possible to have the repairing component 402 in FIG. 4 combined with the repair component 902. Features present in either component can be present in the other component.

Figure 10:
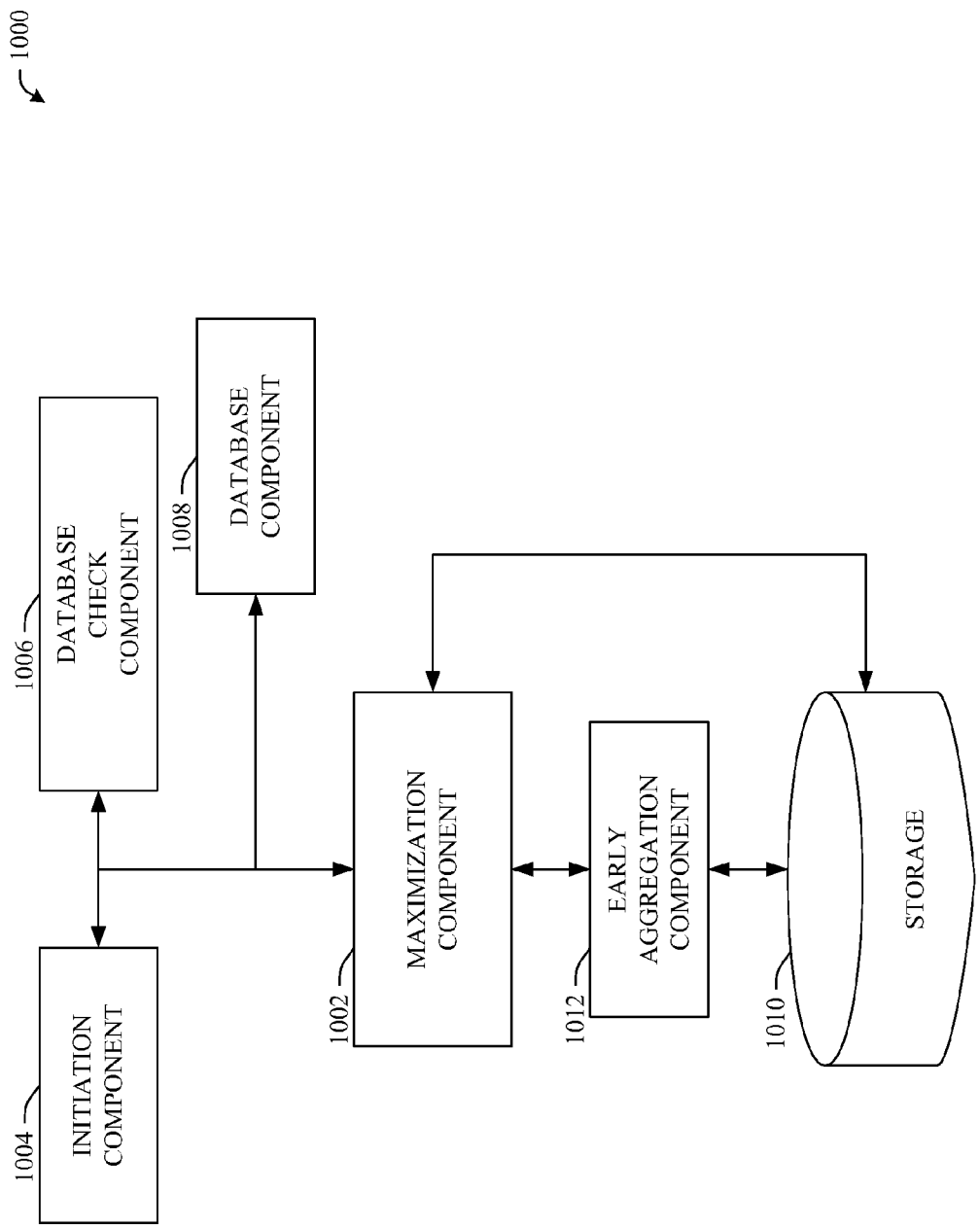
FIG. 10 illustrates a representative database server with a maximization component in accordance with an aspect of the subject specification.

FIG. 10 is an example database server 1000 with a maximization component 1002. An initiation component 1004 sends authorization to database check component 1006 to begin to run a check on a database component 1008. Generally, authorization time is stored in a storage component 1010. The database check component 1006 generates facts about pages in the database component 1008 and facts pass through a maximization component 1002. The maximization component 1002 checks on both the database check component 1006 and an early aggregation component 1012.

The maximization component 1002 functions to allow the database check component 1006 to operate at best or near best performance. In an early aggregation component 1012, a small memory cache can temporarily hold information. This is the location it holds generated facts before the facts transfer into a B-tree index located in a storage component 1010. As the memory cache becomes too full, contents automatically transfer into a temporary file, commonly on a system hard drive. As the contents of the memory cache load into the temporary file, several negative occurrences commonly take place. First, it can be slower for the server to operate out of the temporary file then the memory cache. Secondly, the placement of information on a memory hard drive can reduce overall system performance.

Due to the above-mentioned difficulties, for improved system performance, the maximization component 1002 attempts to operate so no information moves into the temporary file. For example, as a DBCC stores more facts in the storage component 1010, it may take the early aggregation component 1012 longer to complete a check. The maximization component 1002 can recognize the slowdown and delay operation of the DBCC.

For example, a database server has a memory cache that can hold 8-Kilobytes (KB). As a DBCC begins, memory cache is empty. As the DBCC scans pages of the database component 1008, the database check component 1006 can generate facts about the page. Facts generated by the database check component 1006 are ultimately stored in the storage component 1010, commonly in a B-tree index. After each fact is generated, the early aggregation component 1012 compares held facts with facts in the B-tree index. However, as the B-tree index becomes larger, it takes the early aggregation component 1012 longer to check a fact. If too many facts build up in the memory cache of the early aggregation component 1012, then stored information moves to the temporary file. Since movement to the temporary file is undesirable, the maximization component 1002 can slow the DBCC to allow the early aggregation component 1012 to process more facts thus freeing more memory.

There can be further implementations of the maximization component 1002. For example, there can be a calculation algorithm that assists in running the maximization component 1002. A calculation component can perform real-time calculations for an amount of time the DBCC takes to scan a page. In addition the calculation component can calculate a duration to generate facts as well as the amount of time it take the early aggregation component 1012 to complete a comparison for one fact. For example, using the example in the previous paragraph, when the 8 KB memory cache fills to 6 KB (75%), the calculation algorithm can run to determine if any actions should be taken to slow the DBCC. This takes place because the goal is to achieve the most efficient consistency check. If the DBCC stops only when the memory cache fills, thus allowing for the early aggregation component 1012 to catch up, then it is possible that this is not efficient process for a consistency check. The calculation component can also be configured to determine when to place the DBCC back to full speed.

In an alternative embodiment of the subject specification, a server administrator selects a process modification. For example, a user can select the times when the DBCC slows down. The user can select the DBCC to run at 75% when memory cache is 25% full, and the DBCC to run at 25% when memory cache is at 70% capacity. In another embodiment of the subject specification, the maximization component 1002 selects any modification of a process. Performance of this selection takes place through an artificial intelligence component, which can be pre-programmed at a server time of manufacture.

Figure 11:
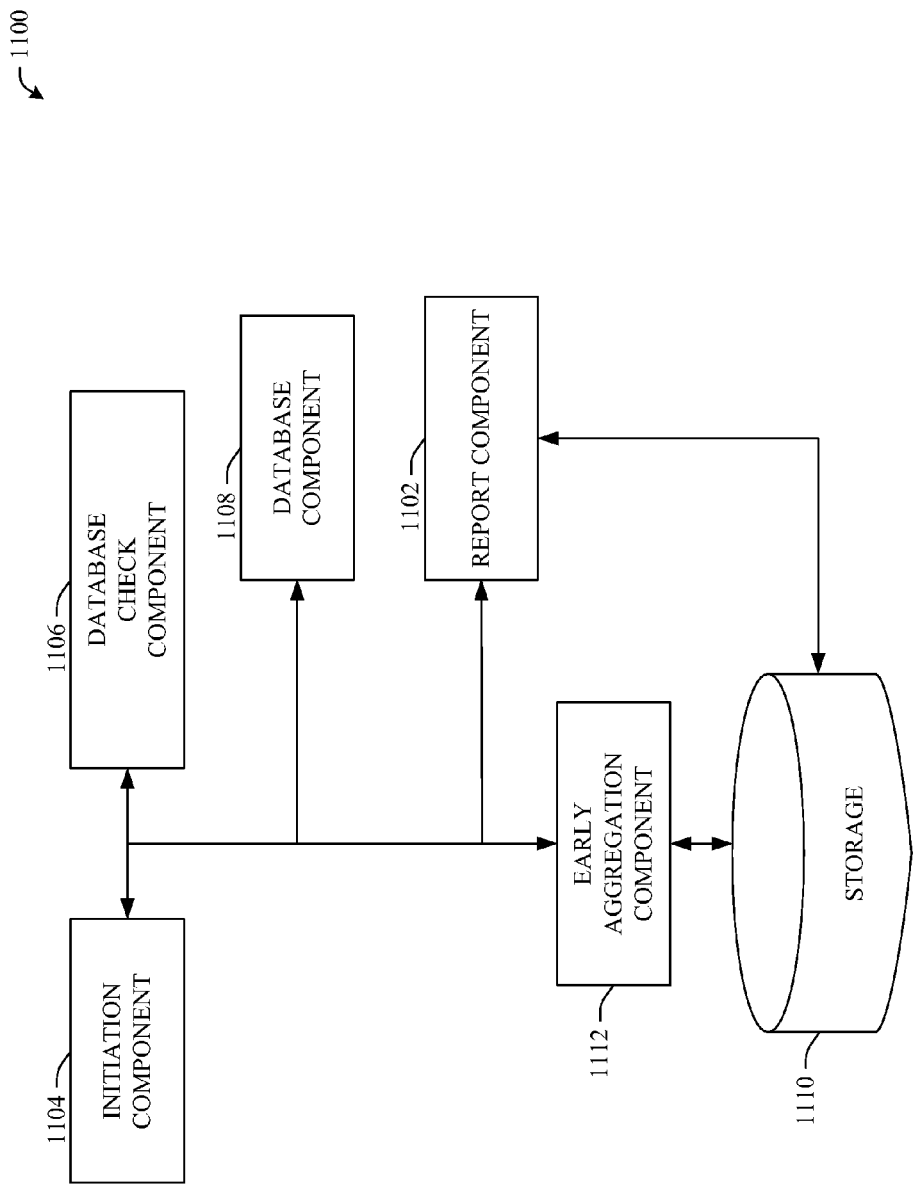
FIG. 11 illustrates a representative database server with a report component in accordance with an aspect of the subject specification.

FIG. 11 is an example database server 1100 with a report component 1102. An initiation component 1104 sends an authorization to a database check component 1106 to run a consistency check (e.g., a DBCC check) on a database component 1108. The report component 1102 is similar to the report component 302 in FIG. 3. This means it can report information about the database server 1100, including information about the initiation component 1104. In addition, the report component 1102 can report information relating to a database check component 1106, a database component 1108, and a storage component 1110, all of which operate to assist in checking consistency of information in the database component 1108.

One of the main differences between the two report components is the report component 1102 has the capability of reporting information about an early aggregation component 1112. This can be a wide array of information, including a number of errors found as well as the average amount of comparisons made for generated facts. Reported information can be in a formalized report created by the report component 1102 or the report component 1102 can report raw data.

In another embodiment of the subject specification, the report component 1102 can report information on other components related to the early aggregation component 1112. For example, if the configuration included the maximization component 1002 of FIG. 10, the report component 1102 could report information relating to maximization. The report component 1102 can inform a server administrator of the amount of time a DBCC is able to run at full potential. Information such as this can assist an administrator in determining the efficiency of consistency checks.

In a further embodiment of the subject specification, the report component 1102 creates a formalized report, and stores the formalized report in the storage component 1110. A server administrator can access the report from the storage component 1110 at a later time. It is also possible to have a management component within the storage component 1110 that compiles raw information received from the report component 1102. This allows for development of an overall view of a consistency check system within a database server 1110.

Figure 12:
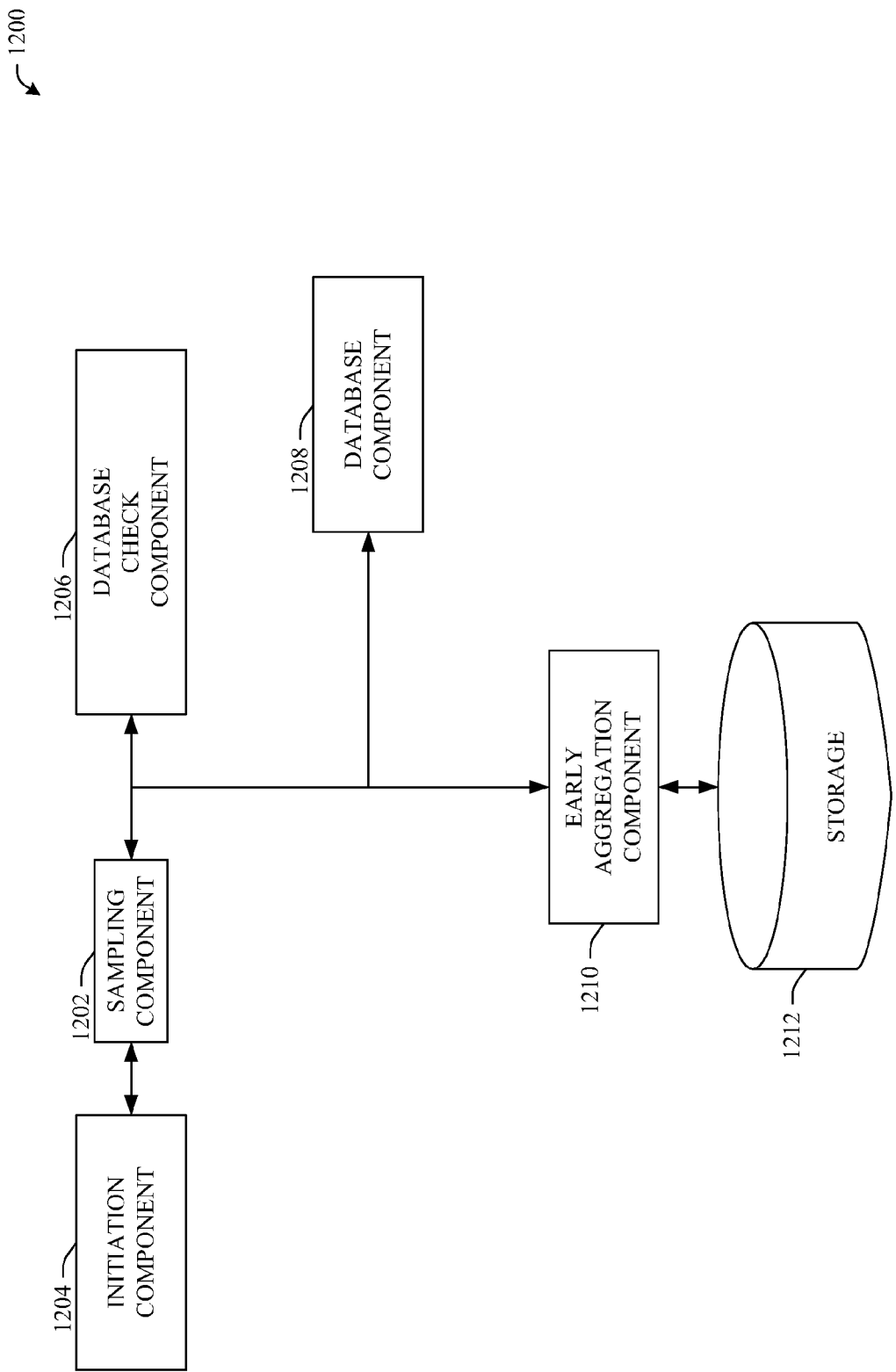
FIG. 12 illustrates representative database server with a sampling component in accordance with an aspect of the subject specification.

FIG. 12 is an example database server 1200 with a sampling component 1202. An initiation component 1204 sends a command to a sampling component 1202 and the sampling component 1202 sends an instruction to a database check component 1206 to run a sample DBCC upon a database component 1208. The sample DBCC runs though an early aggregation component 1210 in a similar fashion to a full DBCC. A sample DBCC runs in lieu of a full DBCC because a full DBCC can be very time consuming. The database check component 1206 can run a full DBCC, usually depending on the sample DBCC. Any fact generated from either the DBCC or information about the DBCCs is stored in a storage component 1212.

While not ideal in many databases, a sampling component 1202 could function to help determine if a full DBCC must take place. In one embodiment, the sampling component 1202 allows the DBCC to generate facts for a limited number of pages. The early aggregation component 1210 runs a check to determine errors. If there are no errors, then the sampling component 1202 can signal the initiation component 1204 that full DBCC does not need to take place. This can be useful on a database server 1200 that benefits from often running DBCCs. Since running a full DBCC can lower overall system performance, a sample DBCC allows for running a DBCC often without using a large amount of system resources.

The sampling component 1202 would typically operate in a database server where the database component 1208 is very small (e.g., there are very few pages) or in a database server 1200 that limits the number of pages to which a page can point. For example, if a database server 1200 limits pages to point to two other pages, there would be a maximum of two facts generated per scan. The database check component 1206 can operate in a sampling manner to scan ten pages, thus producing a maximum of twenty facts. The early aggregation component 1210 then compares each fact. If a fact points to a page that has not yet been scanned, then the early aggregation component 1210 can instruct the database check component 1206 to scan the page in question. While the early aggregation component 1210 completes all comparisons, a total number of errors are known, ranging from zero to twenty. If a certain number of errors is reached (e.g., two errors), then the early aggregation component 1210 can instruct the initiation component 1204 to run a full DBCC. If less then a specific number of errors are found, then a full DBCC is not run. However, it is possible for the full DBCC to run even without finding any errors. The outcome of the sampling component 1202 can assist in estimating error numbers that a full DBCC can find.

Figure 13:
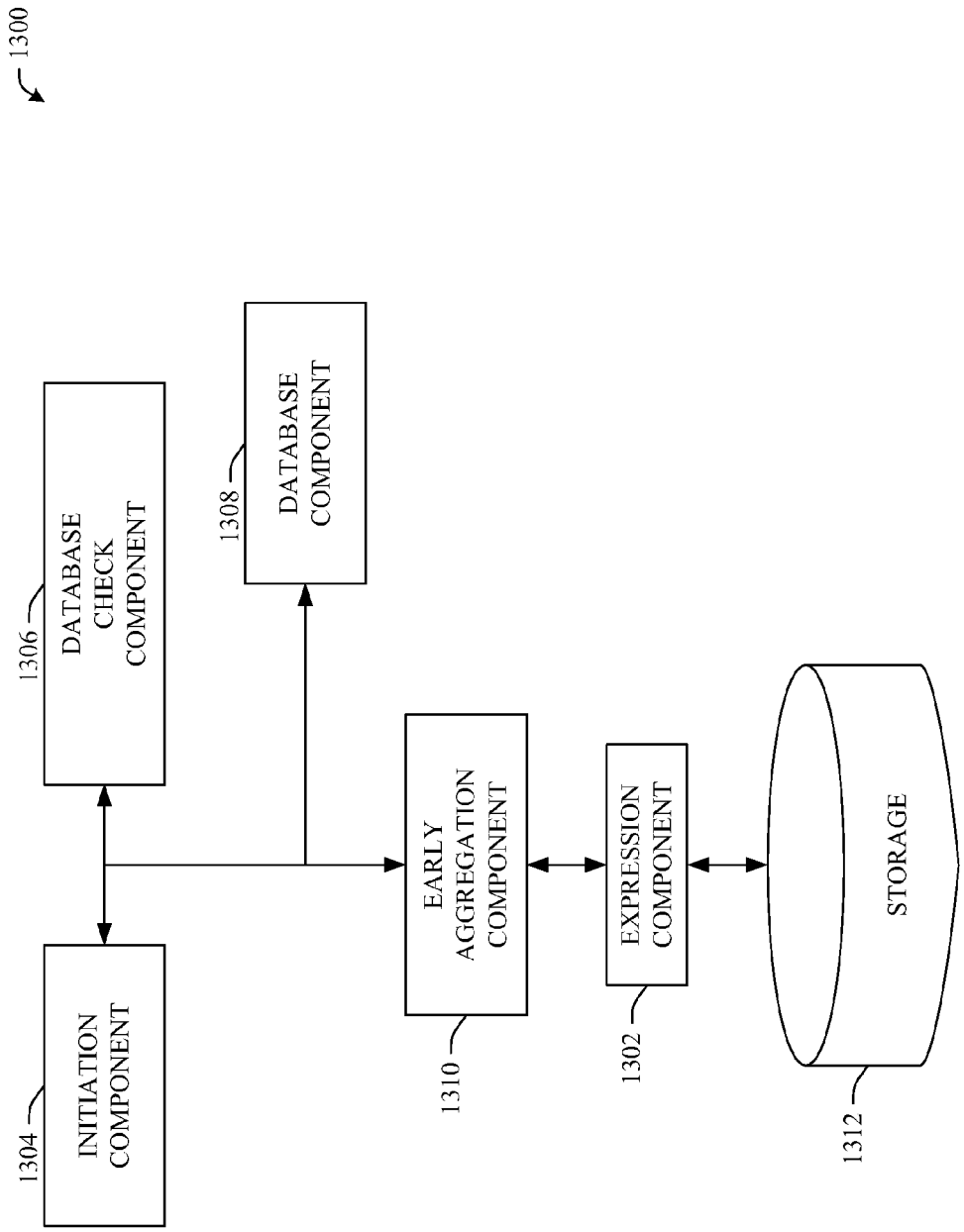
FIG. 13 illustrates representative database server with an expression component in accordance with an aspect of the subject specification.

FIG. 13 is a database server 1300 with an expression component 1302. An initiation component 1304 signals to a database check component 1306 to run a DBCC. The DBCC generates facts relating to pages stored in a database component 1308. An early aggregation component 1310 attempts to cancel facts that relate to one another. Any fact that cannot be cancelled passes through an expression component 1302 before entering a storage component 1312. The expression component 1302 determines how facts are to be stored in the storage component 1312.

The expression component 1302 selects a sorted arrangement to use (e.g., materialized arrangement). A materialized view, also known as an indexed view, is a common implementation (e.g., sort type) used by the early aggregation component 1310 and this is often selected by the expression component 1302. A materialized view is a format in which results (e.g., facts) are stored in a table that updates infrequently. Aggregation work performed by the early aggregation component 1310 is expressed in terms of a view expression selected by the expression component 1302. A B-tree index for storing facts is built on top of the expression. This simplifies the implementation of early aggregation.

Figure 14:
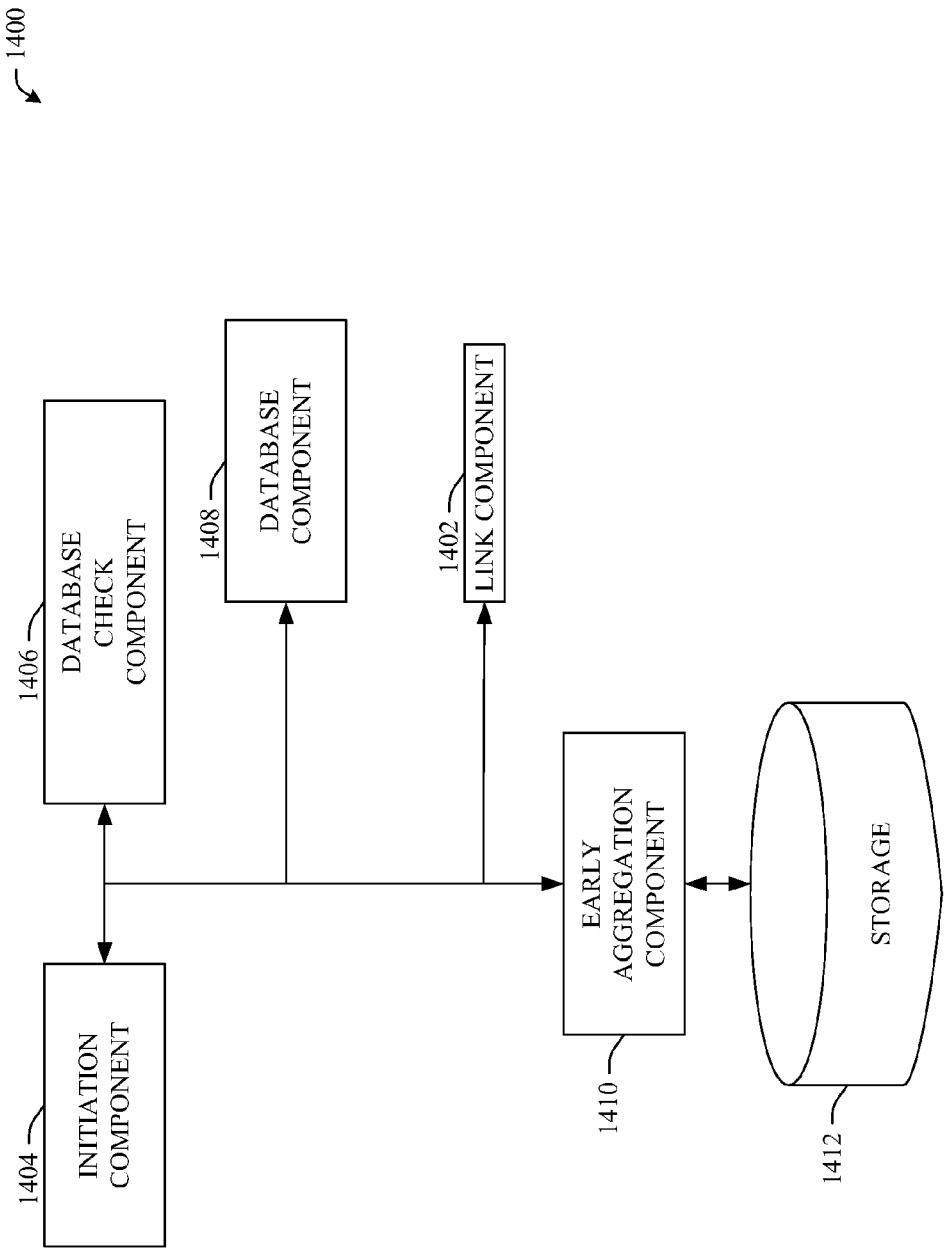
FIG. 14 illustrates a representative database server with a link component in accordance with an aspect of the subject specification.

FIG. 14 is an example database server 1400 with a link component 1402. An initiation component 1404 sends a signal to a database check component 1406 to run a DBCC. The database check component 1406 can run the DBCC on database components inside (e.g., a database component 1408) and outside the database sever 1400 Components on which to run a check are typically determined from the signal of the initiation component 1404. The database server 1400 uses a link component 1402 to communicate with other servers and to operate on their components. The DBCC runs on any database components instructed by the initiation component 1404. In common operation, facts generated return to the database server 1400 to enter into early fact aggregation and to be stored. This is done through an early aggregation component 1410 and a storage component 1412 respectively. However, it is possible for the facts to be stored in other locations, including storage locations on other database servers.

While not shown in the drawings, the link component 1402 can also run in accordance with a supplemental check component. The components shown in the subject specification can integrate together in various configurations. The link component 1402 allows for a supplemental check component to run a SCC as well as the database check component 1406 to run a DBCC on other network servers. Even if other network servers are only equipped to run with database snapshots, the link component 1402 allows an SCC to run on the other servers and for early fact aggregation of generated facts.

In practice, many of the components of the database server 1400 will have different capabilities then components found in other drawings. The reason for the difference is that there will likely be a higher volume of activity on a database server 1400 with a link component 1402. For example, memory cache of the early fact aggregation component 1410 can be larger since it will likely handle a larger amount of facts. In addition, a database check component 1406 can scan faster since there are likely more databases that need scanning.

The link component 1402 can be outfitted with an organization component. The organization component can allow other components not to become confused base on the scans. For example, if facts pass through the same early aggregation component 1410, then similar facts, if not identically named facts, can enter. For example, on database component '2' page 'A' points to page 'B'. On database component '3' page 'B' points to page 'A'. While these appear to cancel each other out, since they are on different database components, they do not actually cancel one another. To help assure that the early aggregation component 1410 does not become confused, the organization component acts to attempt to prevent a mistake as shown in the above example.

Figure 15:
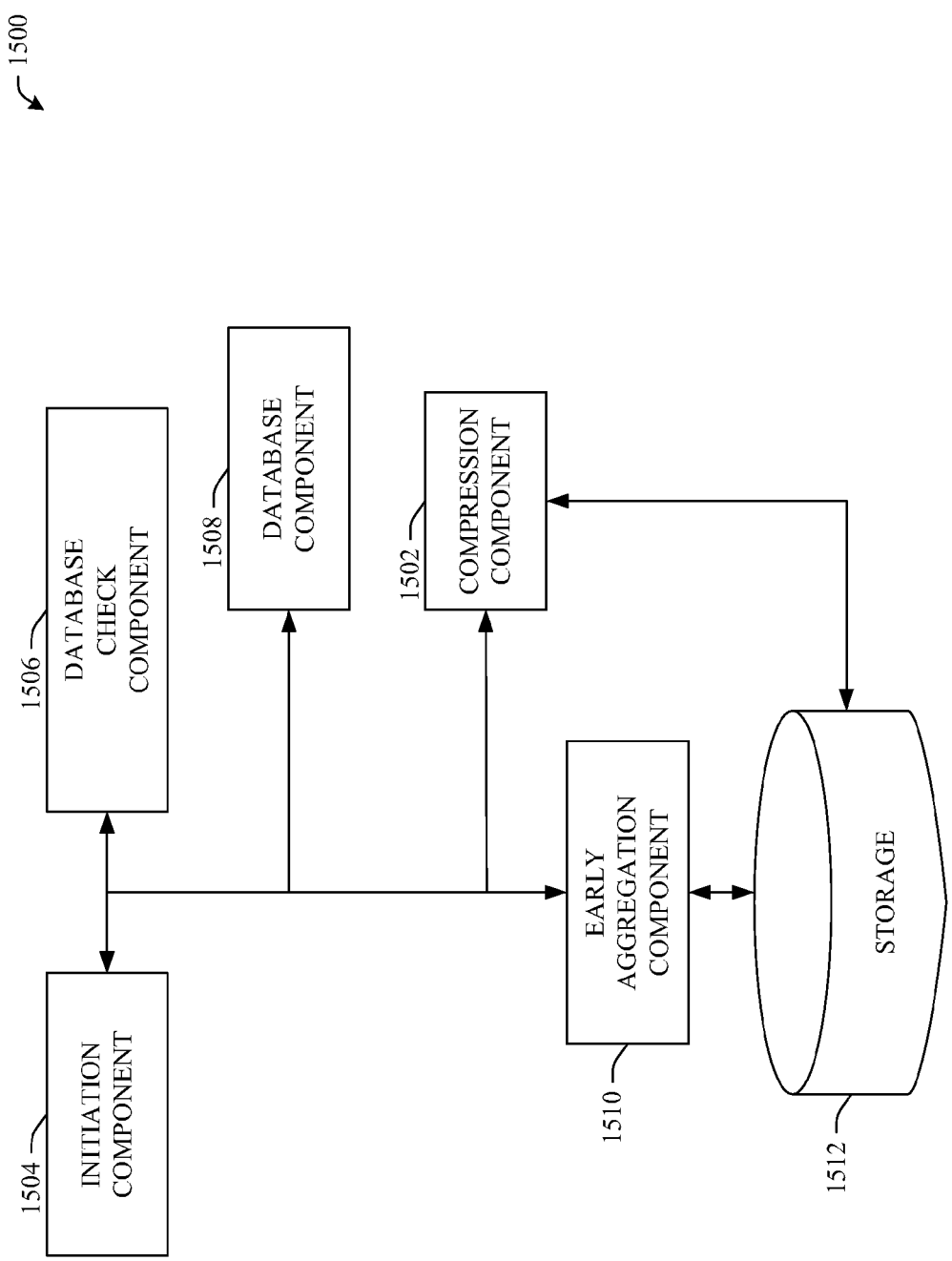
FIG. 15 illustrates a representative database server with a compression component in accordance with an aspect of the subject specification.

FIG. 15 is an example database server 1500 with a compression component 1502. An initiation component 1504 sends an instruction to a database check component 1506 to perform a consistency check on a database component 1508. The database check component 1506 generates facts based on the consistency check, and passes these facts to an early aggregation component 1510. The early aggregation component 1510 compares a held fact with stored facts and if facts cannot cancel out, they are compressed by a compression component 1502 and stored in a storage component 1512. The early aggregation component 1510 should have the capability of comparing facts that are in a compressed format. However, the early aggregation component 1510 can be configured to decompress facts it is checking and resend decompressed facts back to the compression component 1502 for another decompression.

In another embodiment of the subject specification, the compression component 1502 can compress B-trees stored in the storage component 1512. The early aggregation component 1510 can configure to identify what a fact contains in compressed form. This can be take place because every generated fact passes through the early aggregation component

1510, so the early aggregation component 1510 can be configured recognize facts that have passed through it at a later time. Once a fact passes through the early aggregation component 1510, it can be compressed and stored into the B-tree. This allows for occupation of less storage in the storage component 1512.

In a further embodiment of the subject specification, any cancelled facts can travel to the compression component 1502 and these facts can be compressed and stored as opposed to mere deletion. A database server 1500 can have a reason to look at the cancelled facts once have been cancelled from the early aggregation component 1510. Some reasons for doing this are to check on the accuracy of the early aggregation component 1510 and to keep an average of a number of pages in which a single page points. As stated elsewhere in the subject specification, a desire in database operations is to lower the amount of consumed memory. The compression component allows the cancelled facts to be stored in a smaller location then conventional operation.

Figure 16:
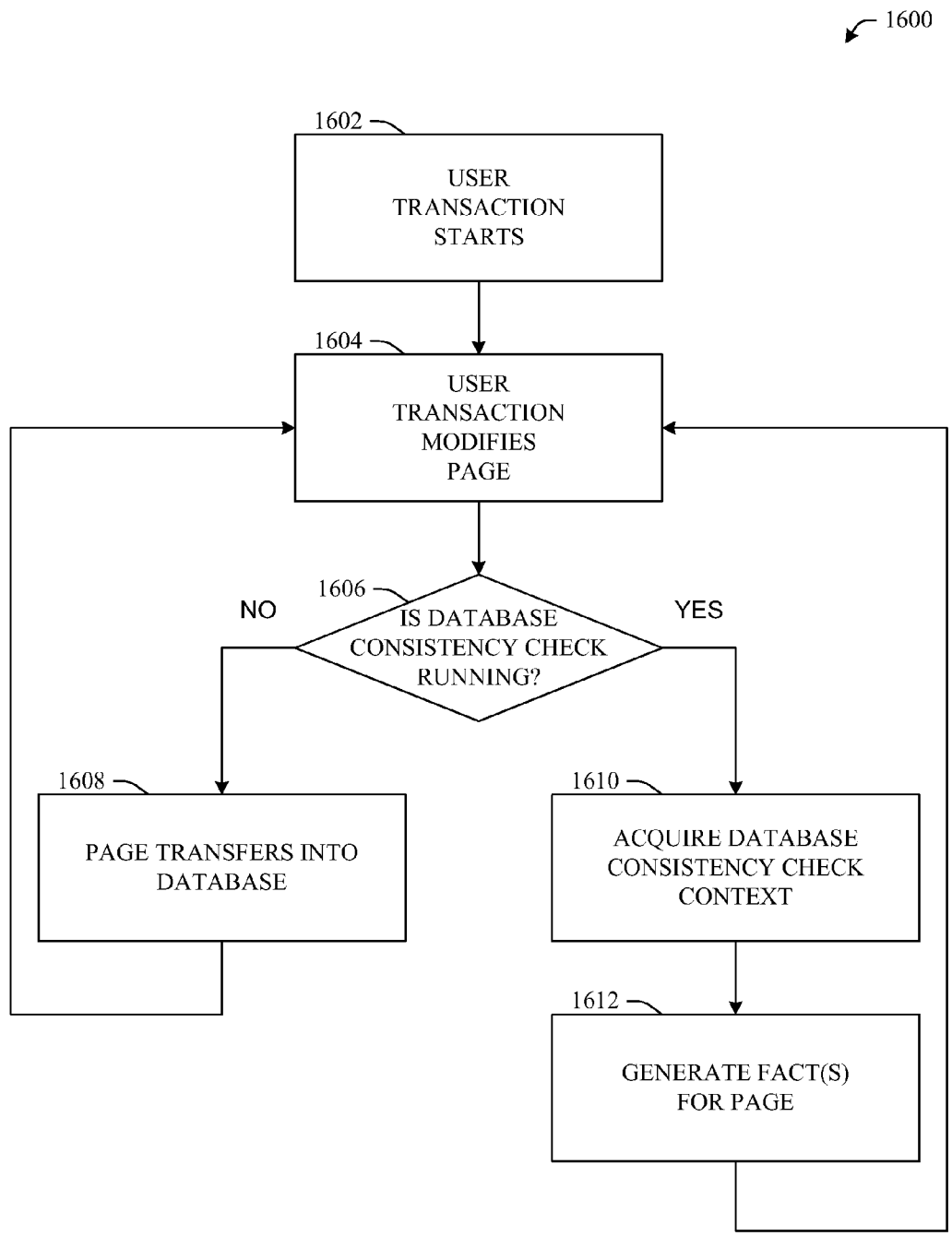
FIG. 16 illustrates a representative methodology of scanning modified pages during a database consistency check in accordance with an aspect of the subject specification.

FIG. 16 is an example methodology 1600 of running a supplemental consistency check without using a database snapshot on a server. A user starts a transaction 1602 and during this transaction, the user modifies a page stored in a database 1604. The methodology performs a check to determine if there is a DBCC taking place 1606. If there is no check-taking place, then the page moves into an appropriate location in the database and the methodology returns it for any other modifications during the user transaction 1608. The reason this takes place is there is no harm to a consistency check if the check is not taking place. If the check is running, then the server obtains database consistency context 1610, which is commonly performed by a supplemental check component. The generated facts are about the page and the methodology returns for determining if any other changes take place in the user transaction 1612.

Figure 17:
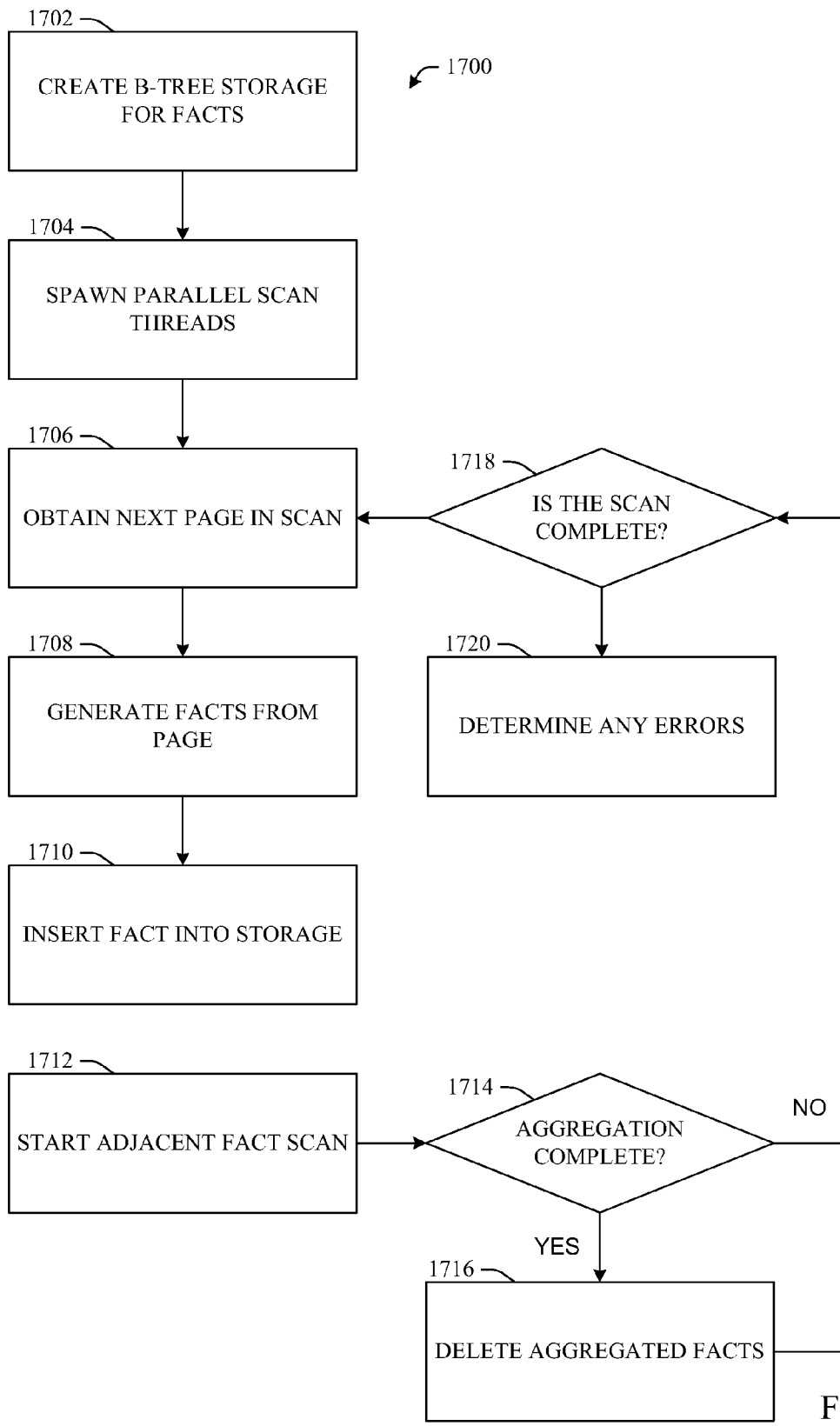
FIG. 17 illustrates a representative methodology of early fact aggregation in accordance with an aspect of the subject specification.

FIG. 17 is an example methodology 1700 of running an early fact aggregation with a DBCC. The methodology creates a B-tree for storing facts 1702. A B-tree is a sorted index that allows for insertions and deletions of rows during run time. A B-tree arrangement would be an appropriate organization for many of the discussed sorts; however, other arrangements can be used. The common organization of a B-tree is one B-tree per fact type. As scanners insert rows into B-trees, there is scanning of adjacent facts to determine if the fact is complete. Therefore, there can be a creation of multiple B-tree indexes during a single consistency check.

Act 1704 is spawning parallel scan threads that assist in connecting the various B-trees together. There can be a number of actions that follow the spawning; however, the present methodology continues to event 1706. Action 1706 is obtaining the next page in a scan. A scan runs by a checking component that checks pages in a database. For many page in the database, a checking component generates a fact 1708. The checking component can be a database check component, a supplemental check component, a component operating with a database snapshot, or other component types. The generated fact transfers into storage 1710 where it stores into an appropriate B-tree, commonly within a storage component.

An adjacent fact scan begins 1712, commonly after the commencement of the insertion of facts in the B-tree. This scan checks if the facts are in an adjacent location in the B-tree indexes in the storage component. There is an aggregation check to determine if an aggregation is complete 1714. This can be seen as a complete aggregation (e.g. facts can cancel) or an incomplete aggregation (e.g., facts cannot cancel). If there is a fact that can be cancelled, then event 1716 cancels facts that can aggregate (e.g., a scanned fact and an adjacent related fact). With the deletion of any aggregated facts, the methodology 1700 continues to attempt to obtain another page in the scan. If there is no compete aggregation (e.g., no facts can cancel one another out), then the methodology 1700 continues toward another page scan.

Regardless of the outcome of event 1714 there is a check determining if there is a completion of the scan 1718. The completion of the scan commonly means that no pages in the database remain un-scanned. If there are more pages in the scan, then the methodology 1700 obtains another page 1706. If there are no more pages for scanning, then the methodology 1700 attempts to determine errors present in the database 1720. Facts that remain (e.g. facts that have not cancelled with another fact) signify a consistency error. As an implementation optimization, the methodology 1700 can be implemented as a materialized view over fact storing structures. As rows insert into fact storage, the view definition can be executed and could perform the aggregation, removing any rows from storage that are "aggregate-complete".

This methodology discloses storing facts first, then pulling them from the storage to perform aggregation. Disclosed components can arrange to perform this functionality in addition to attempting to aggregate a fact prior to any storage, as well as other configurations.

Figure 18A:
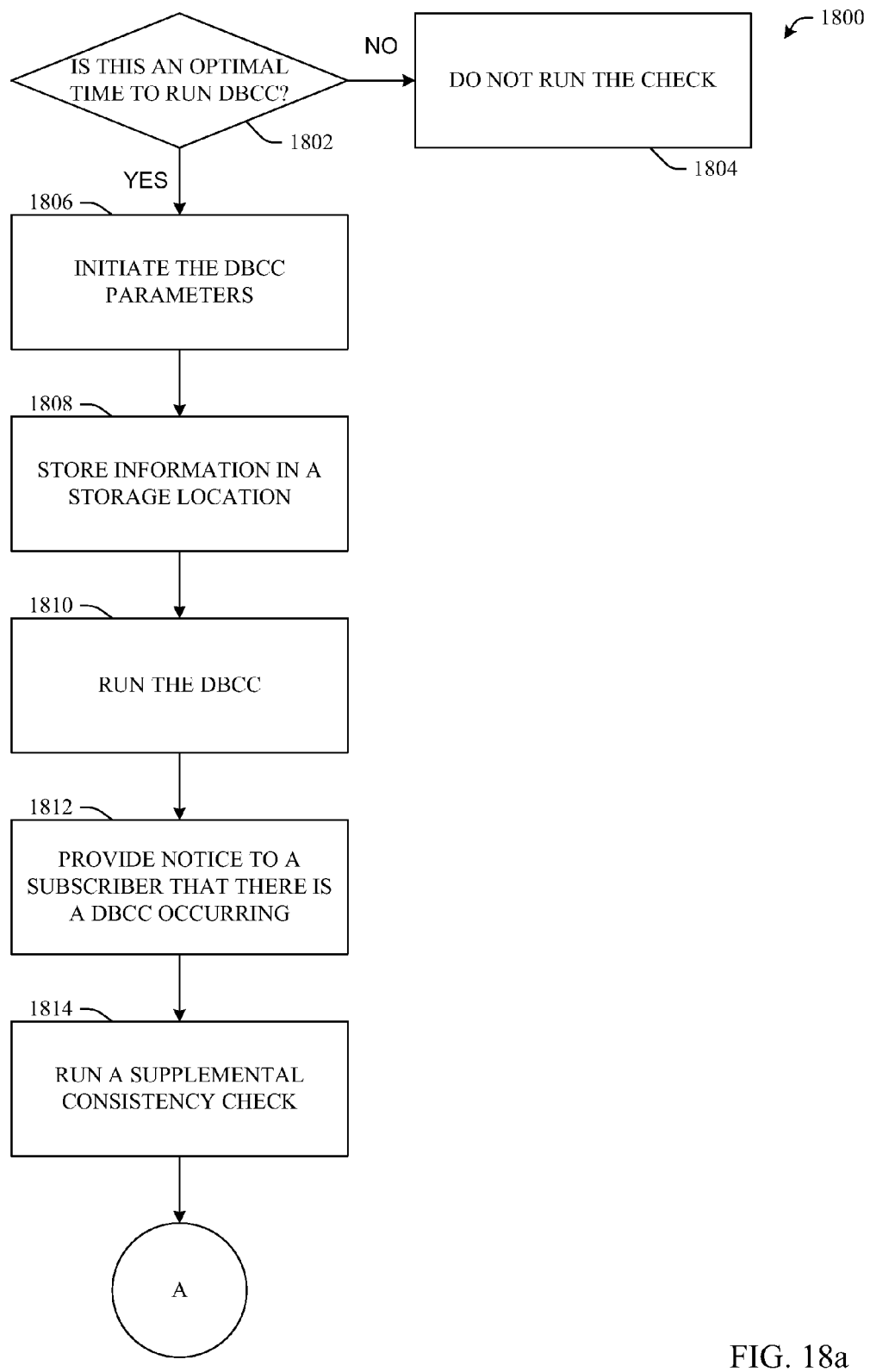
FIG. 18*a* illustrates a first part of a representative methodology practicing several embodiments disclosed in the subject specification.
Figure 18B:
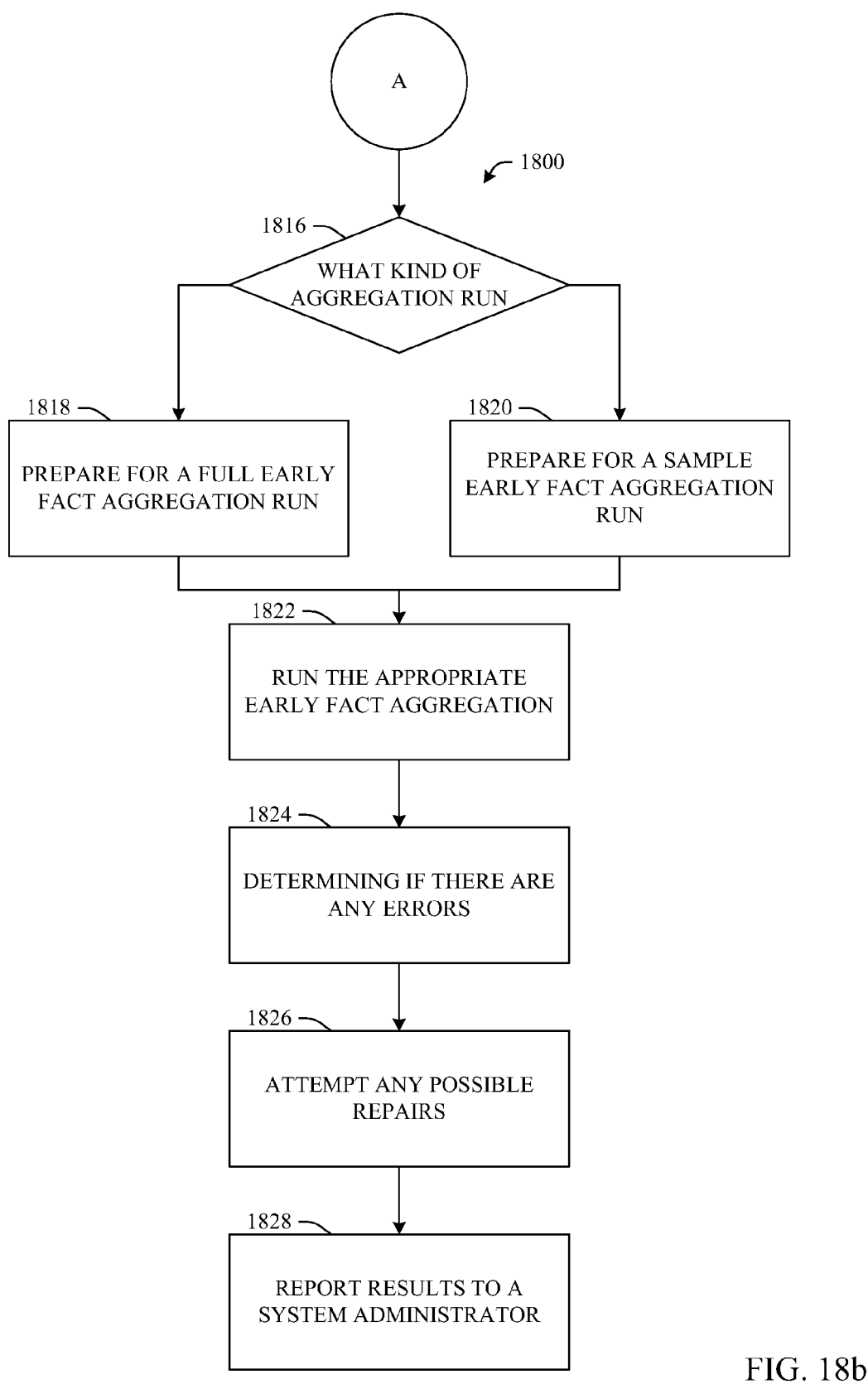
FIG. 18*b* illustrates a second part of a representative methodology practicing several embodiments disclosed in the subject specification.

FIG. 18*a-b* is an example methodology 1800 of a consistency check running various aspects of the subject specification. Most operations of the methodology 1800 take place within a server. An action takes place checking if it is an appropriate time to run a DBCC 1802. For example, there can be a server configuration that allows a check to take place where there is only a limited amount of traffic. If the time is not optimal, then the methodology does not run the check 1804. This denial can include rescheduling the time or performing a constant check to determine if the traffic is low enough to run the check in allowable conditions.

Act 1806 is initiating DBCC parameters, which is commonly done by the initiation component if it is an optimal time. This means that a signal travels to appropriate components demonstrating that it is time to operate. An example of a parameter is to which device to store generated facts. Database information is commonly stored in a storage location 1808. Stored information can be virtually anything, such as storing what time an initiation signal is sent was well was if the methodology 1800 performed an optimization check 1802. While not shown in the methodology 1800, a number of acts can add information to a storage component.

The next two actions are typically run within the same process, but are two distinct events. A first action is a running of a DBCC 1810, which normally runs without a database snapshot. The DBCC checks pages located within a database. Checked pages are commonly stored in a sort in cache memory. As a subscriber (e.g. someone trying to modify a database page) attempts to start a transaction, the methodology 1800 provides notice to a subscriber that a DBCC is taking place 1812. This way the subscriber can choose to operate their transaction at another time. At this action 1812, the subscriber can also be given an expected time for the check to be complete, the server can register a log and notify the subscriber when the check is complete, compensate the subscriber (e.g., give financial credit to their account), as well as numerous other options. In another embodiment, consistency checks can slow or pause to allow a user transaction to take place. Therefore, there is no interruption to a subscriber. This can be beneficial in implementations where a subscriber transaction is top priority (e.g., a situation where delays can cause a customer to take business to another provider).

When a user selects to continue with their transaction, they can modify a page in the database though the transaction. When there is a page modification, a supplemental check component runs a SCC 1814. In one context, this means that the subscriber initiates the SCC, likely without even knowing it. This check views the page once and generates facts accordingly. The page transfers to the database and the DBCC does not run on the page since it has already been checked by the SCC. Facts generated by the SCC are commonly stored in the same location as facts from the DBCC. The running of the SCC does not usually take place if no changes take place to the page during the DBCC, since there are no pages modified during the DBCC.

Action 1816 determines which type of aggregation to run. While the present methodology 1800 operates with early-fact aggregation, it is possible to run other types of aggregation, including aggregation following the completion of any checks. In one embodiment, a system prepares to run one of two types of fact aggregation. The first type is full early-fact aggregation 1818. This full aggregation performs a complete check of facts and pointers created in a database. This allows for a complete understanding of a database's consistency. The second type is sample early-fact aggregation 1820. While not plausible in many situations, a sample fact aggregation can give a general impression of the database consistency while not taking as long as full fact aggregation. For example, a sample aggregation can be run once a week in addition to a guaranteed full run once a week. If after a specified time or amount (e.g., 20% completion) of the checks, if there is a certain amount of cancellations, then the server stops the check. If there is not a certain amount of cancellations, then the system moves to complete full early-fact aggregation.

The methodology 1800 runs an appropriate early-fact aggregation 1822. This aggregation performs real-time aggregation with the DBCC and SCC. Facts left over after completion of aggregation are determined as errors 1824. The system can attempt to repair these errors, typically though a repair component 1826. Results of at least some of the above actions are commonly reported to a system administrator 1828. In reporting results, a specific report can be created or information can be sent as raw data.

Figure 19:
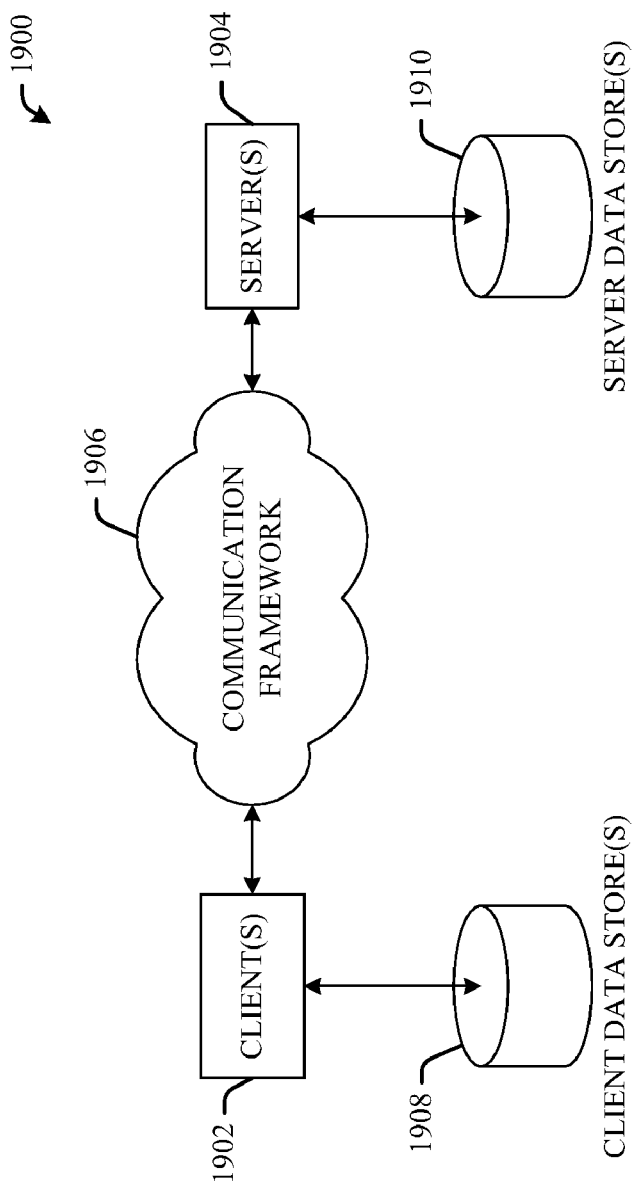
FIG. 19 illustrates an example of a schematic block diagram of a computing environment in accordance with the subject specification.

Referring now to FIG. 19, there is illustrated a schematic block diagram of a computing environment 1900 in accordance with the subject specification. The system 1900 includes one or more client(s) 1902. The client(s) 1902 can be hardware and/or software (e.g., threads, processes, computing devices). The client(s) 1902 can house cookie(s) and/or associated contextual information by employing the specification, for example.

The system 1900 also includes one or more server(s) 1904. The server(s) 1904 can also be hardware and/or software (e.g., threads, processes, computing devices). The servers 1904 can house threads to perform transformations by employing the specification, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

Figure 20:
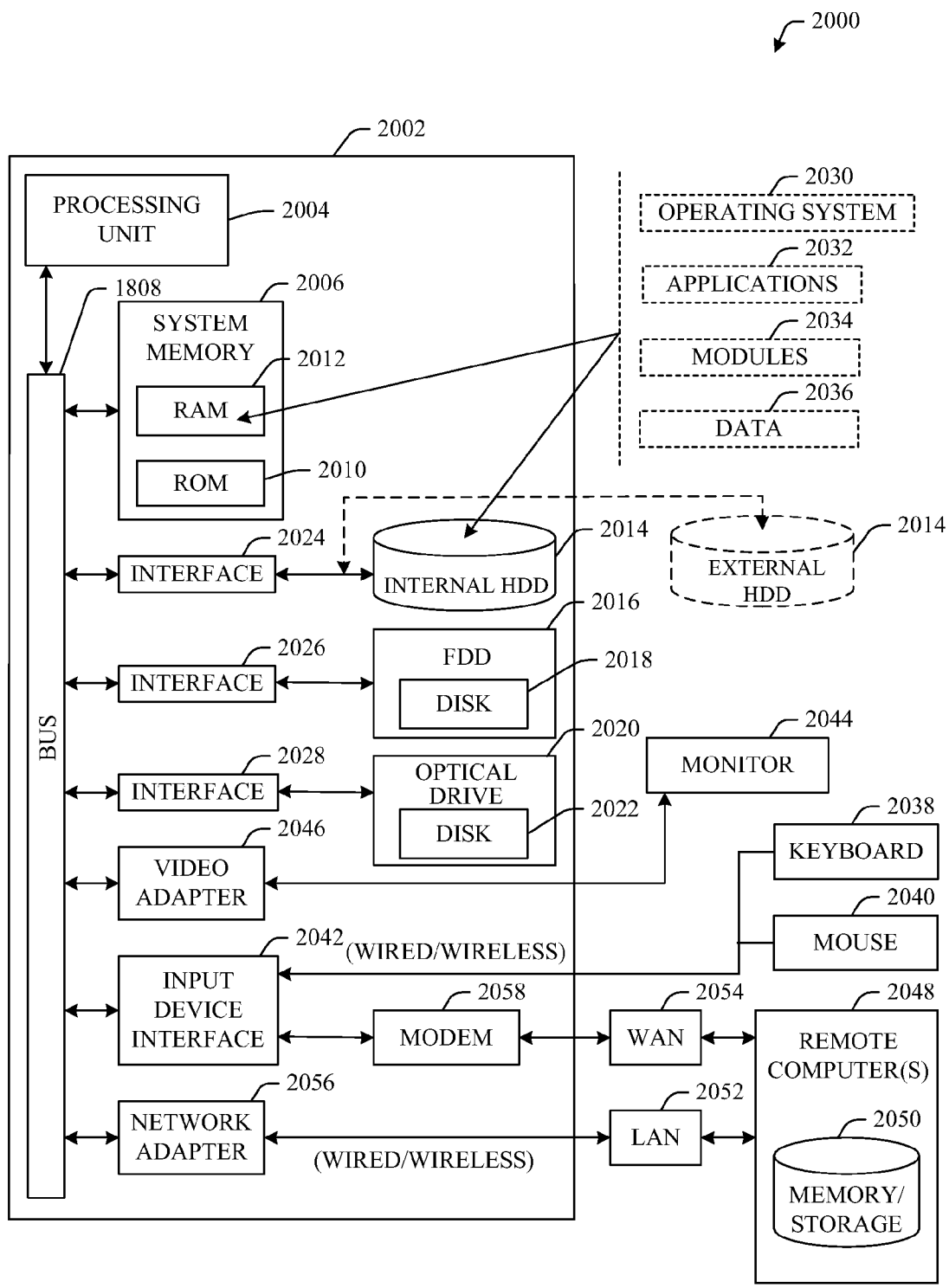
FIG. 20 illustrates an example of a block diagram of a computer operable to execute the disclosed architecture.

Referring now to FIG. 20, there is illustrated a block diagram of a computer operable to execute the disclosed architecture. In order to provide additional context for various aspects of the subject specification, FIG. 20 and the following discussion are intended to provide a brief, general description of a suitable computing environment 2000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 20, the example environment 2000 for implementing various aspects of the specification includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures may also be employed as the processing unit 2004.

The system bus 2008 can be any of several types of bus structure that may further interconnect to a memory bus (with or without a memory controller), a peripheral bus, and a local bus using any of a variety of commercially available bus architectures. The system memory 2006 includes read-only memory (ROM) 2010 and random access memory (RAM) 2012. A basic input/output system (BIOS) is stored in a non-volatile memory 2010 such as ROM, EPROM, EEPROM, which BIOS contains the basic routines that help to transfer information between elements within the computer 2002, such as during start-up. The RAM 2012 can also include a high-speed RAM such as static RAM for caching data.

The computer 2002 further includes an internal hard disk drive (HDD) 2014 (e.g., EIDE, SATA), which internal hard disk drive 2014 may also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 2002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is appreciated that the specification can be implemented with various commercially available operating systems or combinations of operating systems.

A user can enter commands and information into the computer 2002 through one or more wired/wireless input devices, e.g. a keyboard 2038 and a pointing device, such as a mouse 2040. Other input devices (not shown) may include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 via an interface, such as a video adapter 2046. In addition to the monitor 2044, a computer typically includes other peripheral output devices (not shown), such as speakers, printers, etc.

The computer 2002 may operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g. a wide area network (WAN) 2054. Such LAN and WAN networking environments are commonplace in offices and companies, and facilitate enterprise-wide computer networks, such as intranets, all of which may connect to a global communications network, e.g., the Internet.

When used in a LAN networking environment, the computer 2002 is connected to the local network 2052 through a wired and/or wireless communication network interface or adapter 2056. The adapter 2056 may facilitate wired or wireless communication to the LAN 2052, which may also include a wireless access point disposed thereon for communicating with the wireless adapter 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 via the serial port interface 2042. In a networked environment, program modules depicted relative to the computer 2002, or portions thereof, can be stored in the remote memory/storage device 2050. It will be appreciated that the network connections shown are example and other means of establishing a communications link between the computers can be used.

The computer 2002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art may recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates database consistency checking, comprising:
    a processor;
    a memory communicatively coupled to the processor; the memory having stored therein computer-executable instructions configured to implement the database consistency checking system including:
    a database component that stores information;
    a database consistency check component that, once started, begins generating facts relating to pages of the database component;
    a supplemental database consistency check component that generates facts relating to pages of the database component for pages that have changed since starting the database consistency check component;
    wherein generated facts are stored in packets of information about a given page, the generated facts comprising at least information indicating that a first page points to a second page;
    wherein the database consistency check component determines for one or more given pages that the supplemental database consistency check component has already generated facts based on the one or more pages having been changed since starting the database consistency check component, and as a result, the database consistency check component determines not to generate facts for the one or more given pages; and
    an aggregation component, wherein the aggregation component aggregates facts by canceling facts against each other, including at least canceling the fact that the first page points to a second pages against a fact that the second page points to the first page, and wherein any left over facts that have not been cancelled after aggregation indicates a consistency error in the database component.

2. The system of claim 1, further comprising an optimization component that determines an appropriate time to run the consistency check.

3. The system of claim 1, further comprising a notification component that notifies a potential page modifier that the consistency check is taking place.

4. The system of claim 1, further comprising a report component that reports results from the consistency check.

5. The system of claim 1, further comprising a repairing component that repairs errors discovered by the database consistency check.

6. The system of claim 1, further comprising a sampling component that initiates the database check component to run a sample consistency check.

7. The system of claim 1, further comprising a link component that allows the consistency check to run on information in a plurality of database components in a plurality of servers.

8. A system that facilitates database consistency checking, comprising:
    a processor;
    a memory communicatively coupled to the processor; the memory having stored therein computer-executable instructions configured to implement the database consistency checking system including:
    a database consistency check component that, once started, begins generating facts about all of the pages stored in a database component;
    a supplemental database consistency check component that generates facts relating to pages of a database component for pages that have changed since starting the database consistency check component;
    wherein generated facts are stored in packets of information about a given page, the generated facts comprising at least information indicating that a first page points to a second page;
    wherein the database consistency check component determines for one or more given pages that the supplemental database consistency check component has already generated facts based on the one or more pages having been changed since starting the database consistency check component, and as a result, the database consistency check component determines not to generate facts for the one or more given pages; and
    an early aggregation component that aggregates the facts at least partially during operation of the database check component, wherein the aggregation component aggregates facts by canceling facts against each other, including at least canceling the fact that the first page points to a second pages against a fact that the second page points to the first page, and wherein any left over facts that have not been cancelled after aggregation indicates a consistency error in the database component.

9. The system of claim 8, further comprising a maximization component that selects a combined operation of fact generation and any aggregation.

10. The system of claim 8, further comprising an expression component that selects a sorted arrangement to store non-aggregated facts.

11. The system of claim 8, further comprising a compression component that compresses the facts.

12. The system of claim 8, further comprising a link component that allows the consistency check to run on information in a plurality of database components in a plurality of servers.

13. The system of claim 8, further comprising a link component that allows the aggregation of facts from a plurality of sources.

14. A method for facilitating database consistency checking, comprising:
    employing a processor executing computer executable instructions stored on a computer readable storage medium to implement the following acts:
    determining an optimal time to run a database consistency check that generates facts about all of the pages in a database;
    running the database consistency check, that once started, begins generating facts about all of the pages stored in a database component;
    running a supplemental consistency check that executes upon database pages modified during running of the database consistency check, and that generates facts about the modified pages since starting the database consistency check;

storing the generated facts in packets of information about a given page, the generated facts comprising at least information indicating that a first page points to a second page;

determining for one or more given pages that the supplemental database consistency check has already generated facts based on the one or more pages having been changed since starting the database consistency check, and as a result, the database consistency check determining not to generate facts for the one or more given pages; and aggregating the facts during running of the database consistency check and the supplemental consistency check, including aggregates facts by canceling facts against each other, including at least canceling the fact that the first page points to a second pages against a fact that the second page points to the first page, and wherein any left over facts that have not been cancelled after aggregation indicates a consistency error in the database component.

15. The method of claim 14, further comprising storing non-aggregated facts in a sorted configuration.

16. The method of claim 14, further comprising reporting facts that were not aggregated.

* * * * *